United States Patent
Gabrys et al.

(10) Patent No.: US 6,825,588 B2
(45) Date of Patent: Nov. 30, 2004

(54) UNINTERRUPTIBLE POWER SUPPLY USING A HIGH SPEED CYLINDER FLYWHEEL

(76) Inventors: Christopher W Gabrys, 900 S. Meadows Pkwy #3513, Reno, NV (US) 89511; David R. Campbell, 6850 Sharlands Ave. #W1137, Reno, NV (US) 89523

( * ) Notice: Subject to any disclaimer, the term of this patent is extended or adjusted under 35 U.S.C. 154(b) by 3 days.

(21) Appl. No.: 10/312,114

(22) PCT Filed: Jun. 21, 2001

(86) PCT No.: PCT/US01/20026
§ 371 (c)(1),
(2), (4) Date: Dec. 20, 2002

(87) PCT Pub. No.: WO02/03523
PCT Pub. Date: Jan. 10, 2002

(65) Prior Publication Data
US 2003/0155831 A1 Aug. 21, 2003

Related U.S. Application Data

(60) Provisional application No. 60/270,517, filed on Feb. 21, 2001, provisional application No. 60/237,310, filed on Oct. 2, 2000, provisional application No. 60/234,961, filed on Sep. 23, 2000, and provisional application No. 60/214,019, filed on Jun. 23, 2000.

(51) Int. Cl.$^7$ .............................. H02K 7/09; H02K 7/02
(52) U.S. Cl. .......................... 310/90.5; 310/74; 310/90
(58) Field of Search ..................... 310/90.5, 74; 74/572

(56) References Cited

U.S. PATENT DOCUMENTS

| | | | | |
|---|---|---|---|---|
| 3,858,732 A | * | 1/1975 | Kemper | 414/797.5 |
| 4,211,452 A | * | 7/1980 | Poubeau | 310/90.5 |
| 4,497,670 A | * | 2/1985 | Siga et al. | 148/506 |
| 4,511,190 A | * | 4/1985 | Caye et al. | 310/90.5 |
| 5,531,198 A | * | 7/1996 | Matsuura | 123/294 |
| 5,614,777 A | * | 3/1997 | Bitterly et al. | 310/74 |
| 5,723,923 A | * | 3/1998 | Clagett | 310/74 |
| 5,864,303 A | * | 1/1999 | Rosen et al. | 340/870.37 |
| RE36,168 E | * | 3/1999 | von der Heide et al. | 310/67 R |
| 6,388,347 B1 | * | 5/2002 | Blake et al. | 310/74 |
| 6,570,286 B1 | * | 5/2003 | Gabrys | 310/90.5 |
| 6,664,680 B1 | * | 12/2003 | Gabrys | 310/74 |

FOREIGN PATENT DOCUMENTS

JP        357070737     * 5/1982 ................. 361/87

* cited by examiner

Primary Examiner—Tran Nguyen
(74) Attorney, Agent, or Firm—J. Michael Neary

(57) ABSTRACT

A flywheel uninterruptible power supply includes a solid steel cylindrical flywheel levitated for rotation about a vertical axis at tip speeds greater than 250 m/s on magnetic bearings in a low pressure housing. The cylindrical flywheel has a length L and a diameter D, wherein $L/D \geq 1.0$. A motor/generator attached to said flywheel accelerates the flywheel and maintains it at operating speed for storage of energy; and decelerates the flywheel for retrieval of the stored energy. The flywheel inertia section operates with a maximum stress of greater than 60% and less than 80% of the material yield stress when spinning at fully charged operating speed. The flywheel is constructed from steel with an ultimate strength greater 150 ksi and a toughness greater than 100 ksi (in)^1/2. The flywheel is a solid steel cylinder that is hardened to centerline structure throughout the axial thickness of the large diameter portion that is greater than 40% martensite. The flywheel is a solid steel cylinder that, in normal, fully charged operation, spins at a speed that would cause a fracture failure no sooner than one hundred thousand cycles between the fully charged normal operating speed and ten percent of that normal operating speed. The flywheel is free of flaws with length greater than ⅛th inch at a diameter less than 20% of the outer diameter of the flywheel.

40 Claims, 32 Drawing Sheets

Approximate relation between Rockwell C hardness and tensile strength

Hardness distribution in various sizes of quenched round bars. 4140 Steel quenched in Water Critical diameter determined from the center hardness of a series of quenched round bars. (*Grossmann, Asimow, and Urban.*)[45]

Fig. 2—Multiplying factor for carbon plus grain size (Refs. 4 and 5).

Fig. 1 — Average multiplying factors for several elements in alloy steels containing 0.15 to 0.25 pct carbon (Ref. 5).

Alloy Percentages and Calculated Ideal Critical Diameters of Various Steels

| | 1018 | 4140 | E4340H | 300M | D6ac | H11 | AF1410 |
|---|---|---|---|---|---|---|---|
| C | 0.15-0.20 | 0.38-0.43 | 0.37-0.44 | 0.40-0.46 | 0.42-0.48 | 0.37-0.43 | 0.13-0.17 |
| Mn | 0.60-0.90 | 0.75-1.0 | 0.60-0.95 | 0.65-0.95 | 0.60-0.90 | <0.10 | >0.1 |
| Si | - | 0.15-0.35 | 0.15-0.35 | 1.45-1.80 | 0.15-0.30 | <0.10 | <0.1 |
| Ni | - | - | 1.55-2.00 | 1.65-2.00 | 0.40-0.70 | - | 9.50-10.5 |
| Cr | - | 0.80-1.10 | 0.65-0.95 | 0.70-0.95 | 0.90-1.20 | 4.75-5.25 | 1.80-2.20 |
| Mo | - | 0.15-0.25 | 0.20-0.30 | 0.30-0.45 | 0.90-1.10 | 1.20-1.40 | 0.90-1.10 |
| V | - | - | - | >0.05 | 0.05-0.10 | 0.40-0.60 | - |
| Co | - | - | - | - | - | - | 13.5-14.5 |
| Ideal Critical Diameter* (in) | 0.2-0.4 | 3.2-7.0 | 4.1-12.2 | 11.4-29.9 | 7.0-15.8 | Deep hardening | Deep hardening |
| Toughness | low | medium | high | high | high | low | very high |
| Material Cost | low | medium | medium | high | high | high | very high |

Fig. 12

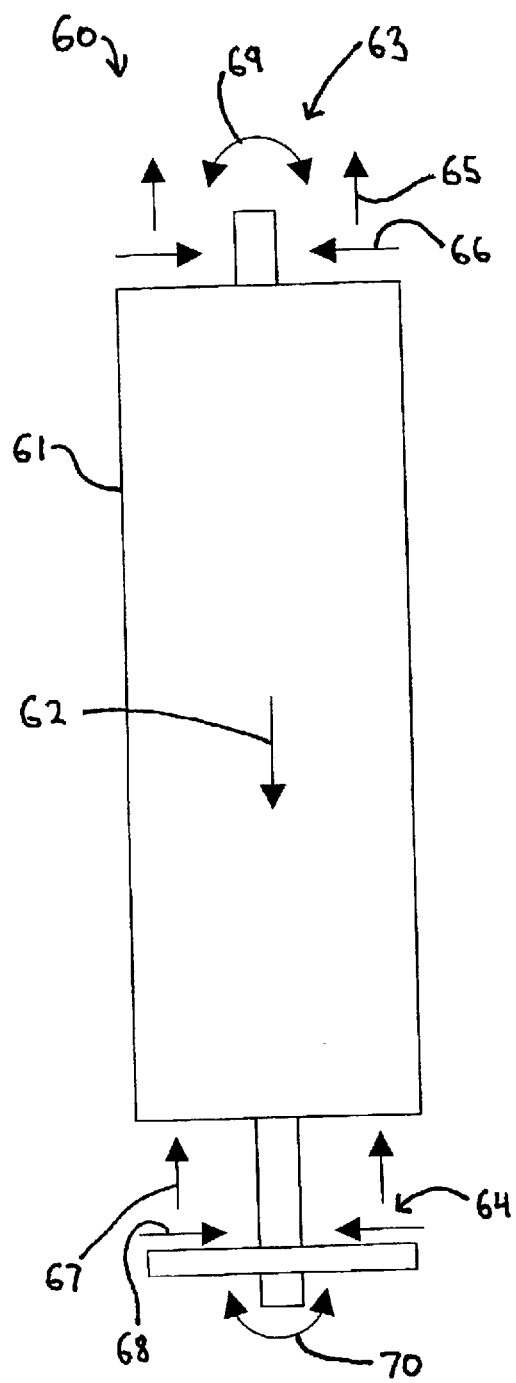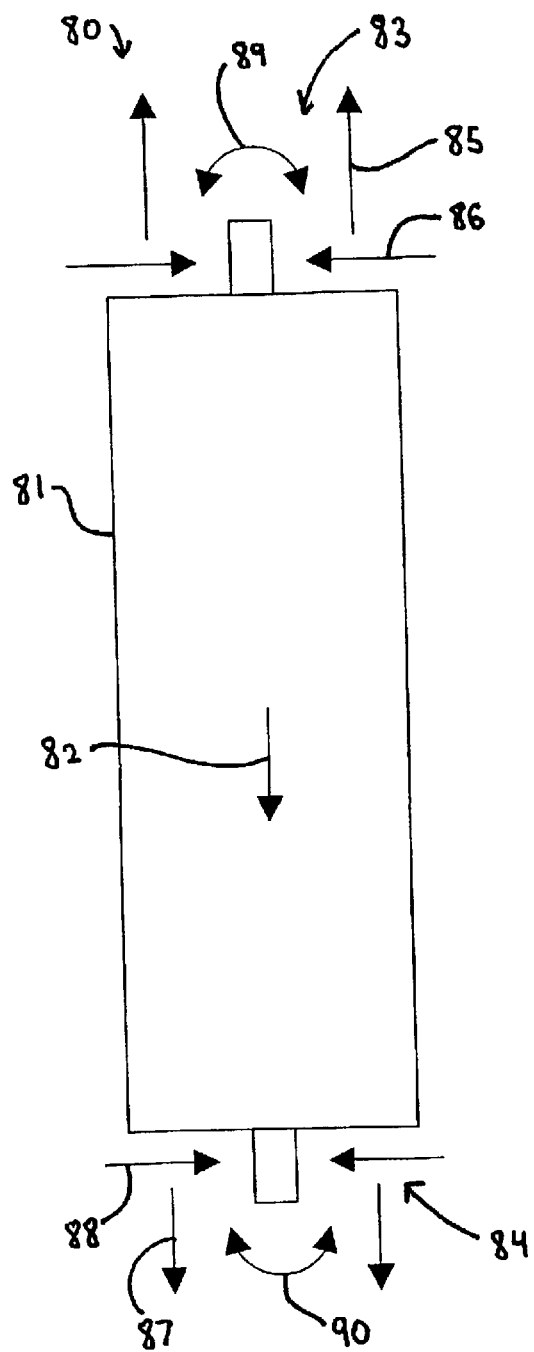
Fig. 23 A
Fig. 23 B

UNINTERRUPTIBLE POWER SUPPLY USING A HIGH SPEED CYLINDER FLYWHEEL

This is related to U.S. Provisional Applications No. 60/214,019 filed on Jun. 23, 2000, No. 60/234,916 filed on Sep. 23, 2000, No. 60/237,310 filed on Oct. 2, 2000 and No. 60/270,517 filed on Feb. 21, 2001 and to International Application PCT/US01/20026 filed on Jun. 21, 2001 and published as International Publication No. WO 02/03523 on Jan. 10, 2002 entitled "Uninterruptible Power Supply Using A High Speed Cylinder Flywheel."

This invention pertains to flywheel energy storage systems used for prevention of power interruptions, and more particularly a flywheel uninterruptible power supply for reliably storing several kilowatt-hours of energy at low cost. The flywheel system uses a solid steel alloy cylinder for a flywheel, which is supported for high-speed rotation using simple passive radial magnetic bearings. Use of a solid flywheel construction with a restricted diameter, steel alloy composition and a fracture mechanics design approach allows for increased operating speed and achievement of energy densities far above those previously obtained with large steel flywheels. This increased energy storage capability makes the flywheel commercially viable for use in back up power applications, significantly reducing the cost of the total flywheel system. A process for manufacture of the flywheel cylinders is disclosed which provides quality assurance of flywheel integrity.

BACKGROUND OF THE INVENTION

Flywheel uninterruptible power supplies are becoming recognized as potentially viable economic alternatives to electrochemical batteries for prevention of power interruptions to critical loads. Electrochemical batteries used in these applications, and valve regulated lead acid batteries in particular, have many undesirable traits. The life of batteries is short, typically between 1 to 7 years depending on the environment and use. They require frequent periodic maintenance and inspection, are subject to thermal degradation and can fail unpredictably. Lead acid batteries and other types as well are also environmentally noxious. However, lead acid batteries are relatively inexpensive. Flywheel systems are thought to have promise to eliminate the disadvantages of batteries with the expectation of achieving 20 year lives with minimal or no maintenance, temperature insensitivity, previously unachievable reliability while being environmentally benign.

Flywheel uninterruptible power supplies use a rotating flywheel to store energy kinetically. A high-speed flywheel stores electrical energy in the rotating inertia of a flywheel. An attached motor/generator is used to accelerate and decelerate the flywheel for storing or retrieving energy. Flywheels can be either constructed of metal or of high strength composite materials. The flywheel can be supported for rotation on mechanical bearings, magnetic bearings or a combination. To reduce the losses from aerodynamic drag, the housing surrounding the flywheel can be maintained at a low pressure, or for slower flywheels it can be filled with a gas of small molecule size such as helium. Many designs of motor/generators exist and can be employed. Motor/generators can also be made as separate components.

Flywheel systems can be divided into two basic categories based on their desired function: power ride-through and energy back-up. A ride-thru system is typically designed for discharging a high level of power for a short duration of time until an auxiliary energy generating means such as a generator set can be brought online. Discharge times range from 10 seconds to about 2 minutes with power levels of up to several hundred kilowatts. Applications for ride-through flywheel uninterruptible power supplies include computer data centers and also critical manufacturing operations such as semiconductor processing. In marketing, ride-through flywheel systems can demand high prices because flywheel systems should have reliability and longevity advantages, and electrochemical batteries are inherently unsuitable and perform very poorly with repeated high power discharges.

The second category of flywheel systems, energy back-up, are used to provide power to support the load for the duration of a power interruption, until the utility power can be restored. Discharge times can be as much as 8 hours or more and the power levels are typically only a few kilowatts or less. Energy storage capacity though is large with multiple kilowatt-hours of storage. Promising applications for these systems are in telecommunications, for maintaining service reliability for telephone, cable TV, wireless and the Internet. Energy back-up flywheel uninterruptible power supplies are marketed based on their energy storage capacity, and because of the low power level, they compete with batteries primarily based on the increased longevity, higher reliability, and lower maintenance requirements. The more difficult cost targets for large energy back-up flywheel systems therefore make minimizing the cost per stored energy extremely important. The potential market for this application is enormous, so there has been considerable interest in developing flywheel energy back-up systems that would satisfy the industry requirements, all to no avail until now.

There are fundamentally two types of flywheel energy storage systems: low speed industrial steel flywheel systems and high speed composite flywheel systems. Commercial flywheel uninterruptible power supplies employing large steel flywheels currently operate with maximum tip speeds of only about 200 to 250 meters per second. The stored energy is proportional to the square of the tip speed and thus energy storage per flywheel size and weight is limited for flywheels with tip speed limited to 250 m/s. Strength and safety concerns have been factors that cause manufacturers to limit the operational speeds to 250 m/s or less. Small diameter steel flywheels can develop higher strengths due the fabrication attributes of the reduced size. For example, small diameter steel hubs for use inside composite energy storage flywheels have been laboratory tested to higher speeds. However to date, commercial operation of large diameter steel energy storage flywheels has been limited to relatively low speeds.

For efficiently storing large amounts of energy, especially in cost sensitive applications such as energy back-up, composite flywheels are commonly considered necessary. Composite flywheels can store large amounts of energy per weight due to the high strength capability of the constituent fibers such as glass and carbon. They can also be made of large diameter size while still having the maximum strength due to the strength being added by the already high strength fibers being wound into the rim. Composite flywheels have been very expensive in the past, however the price in recent years has been dramatically reduced due both to a drop in the price of carbon fiber and also the development of new more economical commercial processes.

Despite the benefits of increased energy storage capability with composite flywheels, they do have several undesirable traits. Composite materials outgass considerably due to the polymer matrix. The copious outgassing makes the maintainability of the vacuum in the surrounding enclosure difficult. Composite materials also experience a reduction in strength from the volumetric addition of resin with the high strength fibers and also some reduction occurs due to the ability of the matrix material, typically an epoxy, to translate the load from one fiber to others. A further reduction in strength results from the winding angle as fibers are wound onto the flywheel rim during manufacture and especially when multiple tows are used to make very large flywheels at low cost. When winding the fibers with the resin to form a composite flywheel rim, void flaws can be introduced into the parts. Despite these reductions in strength, composite material flywheels still have very high fiber direction strengths and for which the reductions can easily be accounted.

Unfortunately, composite material flywheels can exhibit some troublesome attributes that include poor temperature performance as well as creep and stress rupture, Most polymer matrix composite flywheels have low temperature capability, meaning that the epoxy matrix becomes soft at a relatively low temperature. The matrix loses its ability to optimally translate load between fibers with a relatively small increase in operating temperature. Because the radial strength is much lower than the hoop strength in filament wound flywheels, flywheels are usually constructed of multiple rims to mitigate radial stresses. One very common design approach to allow use of low cost thick flywheel rims is to use a glass/epoxy ring, with its lower modulus and higher density, inside a stiffer and lower density carbon fiber/epoxy ring. The glass ring grows with the larger radius carbon ring during rotation and thus avoids development of excessive radial tension. Unfortunately, over time and cyclic stress, the inner glass fibers creep and lose stiffness thereby causing the outer carbon fibers to carry unanticipated extra load. The outer carbon fibers also fatigue and lose strength with cycles. The end result is that a seemingly safe design, that would have had an initial benign radial crack failure, can have a lower speed catastrophic burst failure. Unlike a metal flywheel, where a failure results in pieces being projected radially outward during failure, a composite flywheel can fail exerting energetic fragments vertically or alternatively the fine radially directed fragments can be redirected vertically when they hit the container wall. Because most high energy flywheel systems are planned for shallow underground installation, the possibility of having a relatively uncontained vertical burst after years of operation is very undesirable.

To achieve a 20 year operating life with reliable service, the bearing system that supports the flywheel for rotation is also critically important. Such a bearing system preferably should be a non-contact bearing to preclude wear and not require lubrication, and should be protected from damaged during system shipping and installation. With use of magnetic bearings, it is desirable to have a simple construction and operation both for reduction of costs and also for reliable operation throughout the desired system life. Five active axes magnetic bearing systems are currently available, however to maintain stability, they require constant, very high frequency switching which can cause the amplifiers used to fail after a few years. These systems are also very complex and expensive.

SUMMARY OF THE INVENTION

The disclosed invention is a flywheel uninterruptible power supply capable of storing several kilowatt-hours of energy that achieves long life and higher reliability with significantly reduced costs. The flywheel of the invention is uniquely capable of storing large amounts of energy without using high strength composite materials. The flywheel is constructed of a solid steel cylinder that rotates with an internal stress and energy density more than twice that of previous steel flywheels used in commercial flywheel energy storage systems. The high rotational speed capability is the result of a combination of factors. The flywheel is solid, without a central hole, thereby reducing the hoop stress by 50% compared to a steel flywheel with an axial hole, and allowing equal and maximum hoop and radial stresses at the center. The flywheel is made in the shape of a cylinder and has a diameter dimension selected that enables the center of the flywheel to be subjected to a sufficient quench severity in the heat-treating process to develop high center hardness. The steel alloy used for manufacturing is chosen for deep hardenability, further increasing the cylinder centerline strength, and for its ability to generate high toughness. In one embodiment of the invention, the flywheel diameter is made less than the ideal critical diameter of the alloy steel such that the centerline of the flywheel can achieve 50% martensite structure for significantly improved mechanical properties.

The invention takes into account the specific use of flywheel systems in power quality applications, such as for protection against utility power interruptions. The actual number of full cycles that a flywheel would experience in a power back-up system lifetime is found to be unusually low for typical mechanical components. The number of full charge to full discharge cycles is likely substantially less than 2500 cycles after 20 years of use. Allowing for a substantial safety margin, the total number of such cycles can still be considered to be less than 10,000 cycles. A higher number of incomplete discharge cycles do occur but these have significantly less fatiguing effects. This fact is advantageously used to allow a further increase in the safe flywheel operating speed by employing nondestructive evaluation of the flywheel material to limit the maximum flaw size, in conjunction with a fracture mechanics analysis rated operating speed and use of high toughness steel alloy and heat treat conditions. In one embodiment, a cycle counter is used to prevent operation of the flywheel past its safe life rating.

Current steel flywheels operate at tip speeds of 250 meters per second and lower, storing less than 2 watt-hours per pound of flywheel. This invention allows operation at greater than 350 meters per second and up to roughly 550 meters per second, storing 4 to 10 watt-hours per pound of flywheel. Because of the higher density of steel than composites and the solid construction, the invention can also store more than twice the energy per outside volume of the containment vessel. The result is a significant reduction in the system size and amount of materials required. To operate at to such high speeds, the flywheel is supported using magnetic bearings at each end of the flywheel, preferably passive radial magnetic bearings as disclosed in international patent application no. PCT/US01/13951 filed on May 1, 2001 by Gabrys et al. and entitled "Full Levitation Bearing System with Improved Passive Radial Magnetic Bearings". The passive bearings, which can be of several configurations, reduce the amount of electronic control compared with full five active axes magnetic bearings and are simple, reliable and low cost. In one embodiment, the passive radial magnetic bearings are formed integrally in the axial faces of the flywheel cylinder to simplify construction while reducing costs. The active axial actuator for stabilizing the magnetic bearings can also be integrated into the cylinder face. Power consumption to levitate a flywheel weighing several hundred pounds can be less than 20 watts.

A preferred process for manufacture of the flywheel cylinders is described in which multiple cylindrical flywheels are manufactured from a single forged steel log. The log is quenched and tempered prior to cutting and machining into individual flywheels. This requires more difficult machining of already fully hardened flywheels, however it allows for efficient quality assurance steps to verify absence of flaws and centerline hardness and strength to insure safe operation. In one embodiment, the alloy steel is vacuum arc remelted prior to heat treating to eliminate impurities and promote a high level of uniformity in the cylinder.

The dimensions of the flywheel cylinder are bounded by upper and lower length dimensions for smooth operation. To prevent dynamic instability, the ratio of transverse to polar inertia is preferably greater than 1.2, however the length is preferably shorter than that which would cause encountering a flexural resonance of the cylinder in the operating speed range. By being solid and preferably without any flexural modes below the normal operating speed, the invention reduces the possibility of rotordynamic problems as such have been encountered with previous flywheel systems.

Further benefits of the invention's capability to efficiently store large amounts of energy using a steel flywheel are achieved in the vacuum system that surrounds the flywheel for reduction of aerodynamic drag. The steel flywheel outgases less than 1% of the outgassing of polymer composite flywheels. This makes maintaining the vacuum much easier and less getter material is required to absorb the gases. The use of a cylindrical rotor instead of a disk also has the inadvertent advantage of reducing the cost of the vacuum container. Thinner container wall thickness are possible due to the smaller axial ends and hence smaller bending pressure load. In the event of a loss of vacuum, a composite flywheel would overheat and fail due to its poor thermal conductivity and very low temperature capability and high tip speed. The steel flywheel of the invention would simply slow down due to increased drag. The lower tip speed and higher thermal conductivity of the steel flywheel reduce the level of vacuum required.

The steel flywheel of this invention is in many ways safer than composite flywheels, commonly believed superior for storing large amounts of energy. Safety is increased by use of non-destructive inspection and the drastically increased rotor shock durability, absence of creep and temperature problems, and use of conventional well established materials, processes and testing. In the unlikely occurrence of a flywheel rotational failure, a steel flywheel classically fails in 3 pieces radially outward. The pieces are therefore directed into the soil for systems expectedly installed below ground. The steel flywheel is also completely recyclable and environmentally benign.

DESCRIPTION OF THE DRAWINGS

FIG. 12 is a table of alloy percentages, calculated ideal critical diameters and attributes of various high strength steels.

FIG. 23A is a schematic representation of a magnetic bearing system using cooperative passive radial magnetic bearings.

FIG. 23B is a schematic representation of a magnetic bearing system using opposed passive radial magnetic bearings.

DESCRIPTION OF THE PREFERRED EMBODIMENTS

Figure 1:
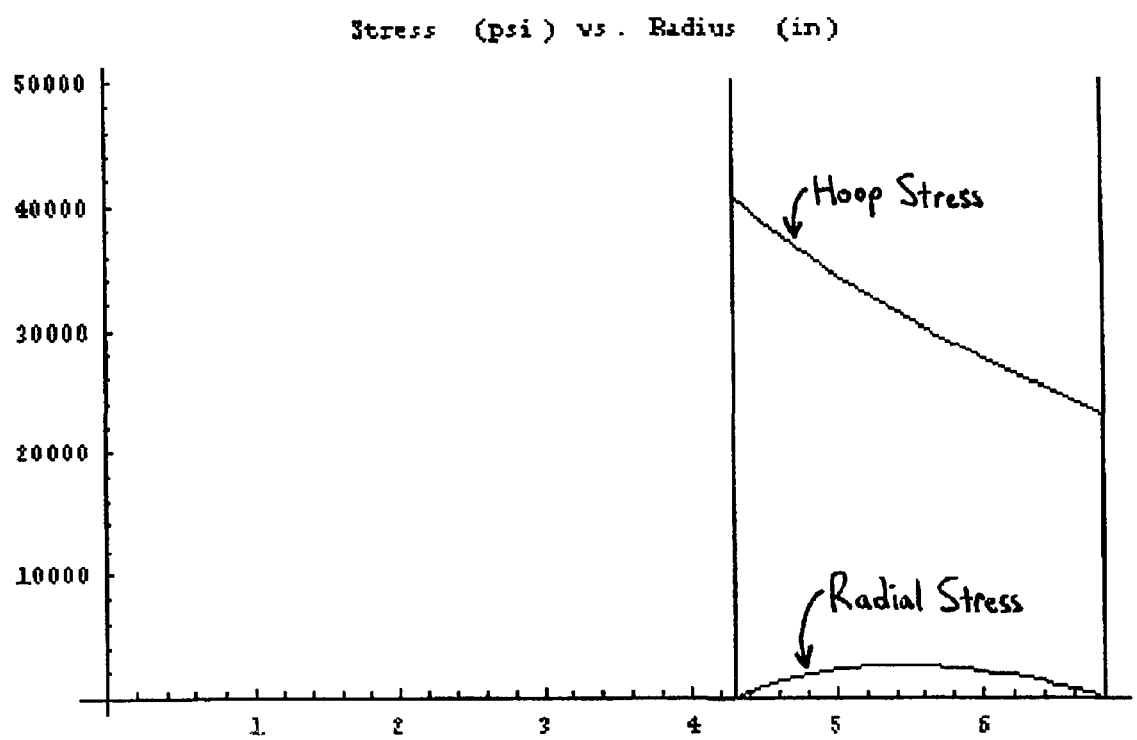
FIG. 1 is a plot of hoop and radial stresses in a steel ring spinning with a tip speed of 250 m/sec.
Figure 2:
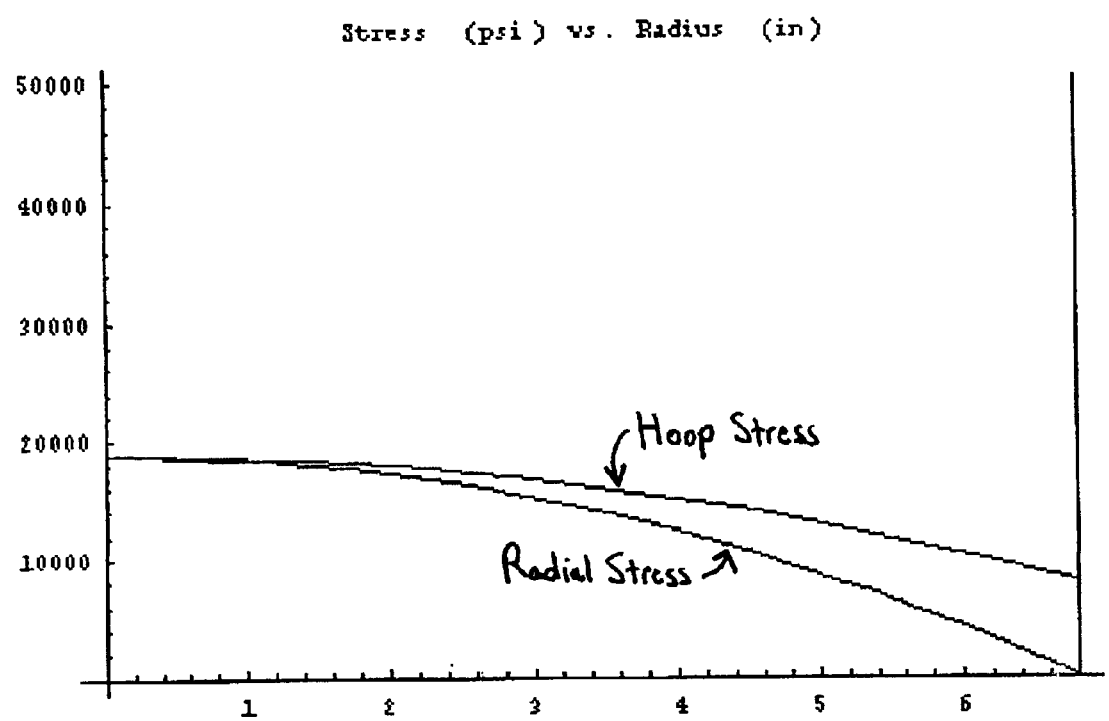
FIG. 2 is a plot of hoop and radial stresses in a steel solid disk spinning with a tip speed of 250 m/sec.
Figure 3:
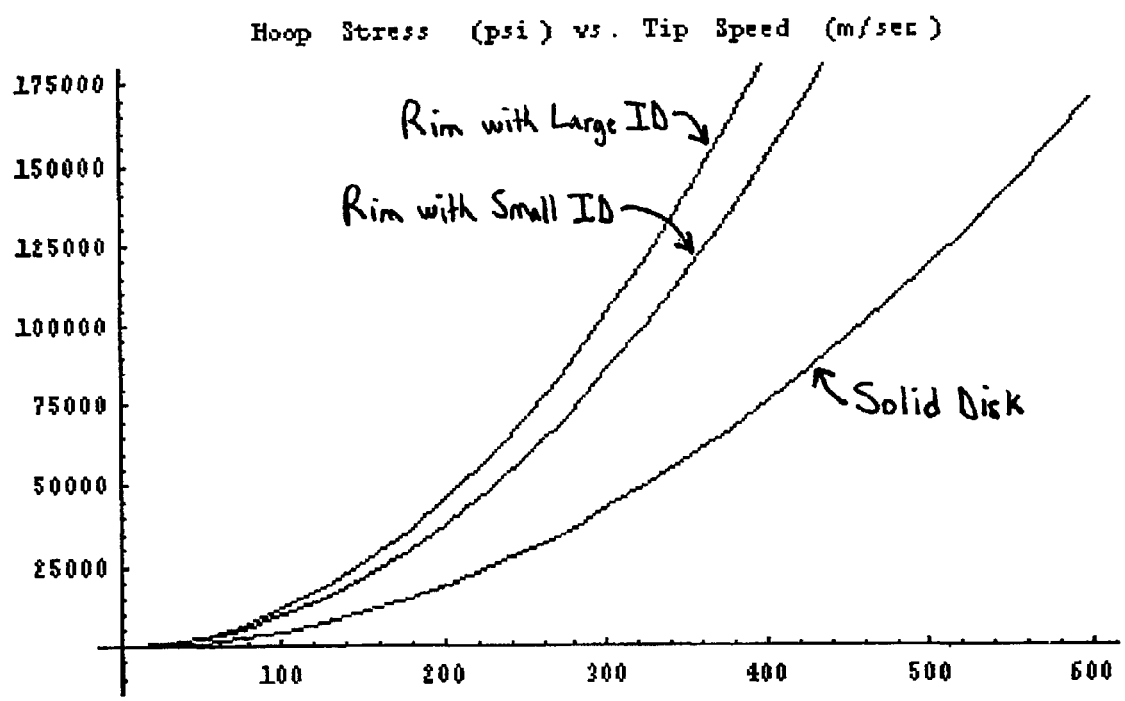
FIG. 3 is a plot of maximum hoop stresses versus tip speed for spinning rings and a solid disk.

Turning to the drawings wherein like characters designate identical or corresponding parts, FIG. 1 is a plot showing the radial and hoop stresses in a steel ring flywheel rotating with a peripheral speed of 250 meters per second. To reduce the flywheel cost and increase the long term reliability of flywheel energy storage systems, it would be very desirable to construct them from steel and be able to rotate them to high speeds for efficiently storing large amounts of energy. From the plot of the stresses in the spinning ring, it can be seen that the hoop stress is highest at the inner diameter, but more importantly; the simultaneous radial stress is very low. The design of a steel flywheel using a ring therefore does not most effectively utilize the material for storing energy. To better utilize the material of the flywheel for storing energy, it would be more preferable to increase its mass and energy storage density in a configuration that achieves maximum stresses in both the radial and hoop directions, thereby making maximum use of the flywheel material. This can be done by making the flywheel solid, without a central hole. FIG. 2 shows the radial and hoop stresses in rotating disk flywheel with the same speed of 250 meters per second. The result of having a solid center is that the maximum hoop stress is much lower and in fact is equal to the radial stress, and both stresses are maximum at the center. The other important result is that the maximum stress in the solid disk is about one half of the maximum stress than in the ring flywheel spinning at the same speed. FIG. 3 shows a comparison of the maximum hoop stresses in a disk and rims, with either large or small inner diameters, versus tip speed. For a ring with a very small inner diameter, such as a pin hole, the maximum stress in the rim is twice the stress in a solid disk. For a ring with larger inner diameter, the maximum stress is more than twice the corresponding stress in a solid disc. Therefore a disk flywheel can be spun to much higher speed and for the same size is capable of storing more energy and it thus preferable for a steel flywheel to have a solid construction. Moreover, a disk flywheel can be made with a tapered cross section, having a thicker center tapering to a smaller thickness at its outside periphery, and this allows even higher speeds by equalizing the stresses over the entire flywheel. However, this is thought to be an impractical solution for large capacity commercial flywheels because it requires expensive manufacturing and the energy storage capacity is limited by diameter prescribed cross section profile.

Figure 4:
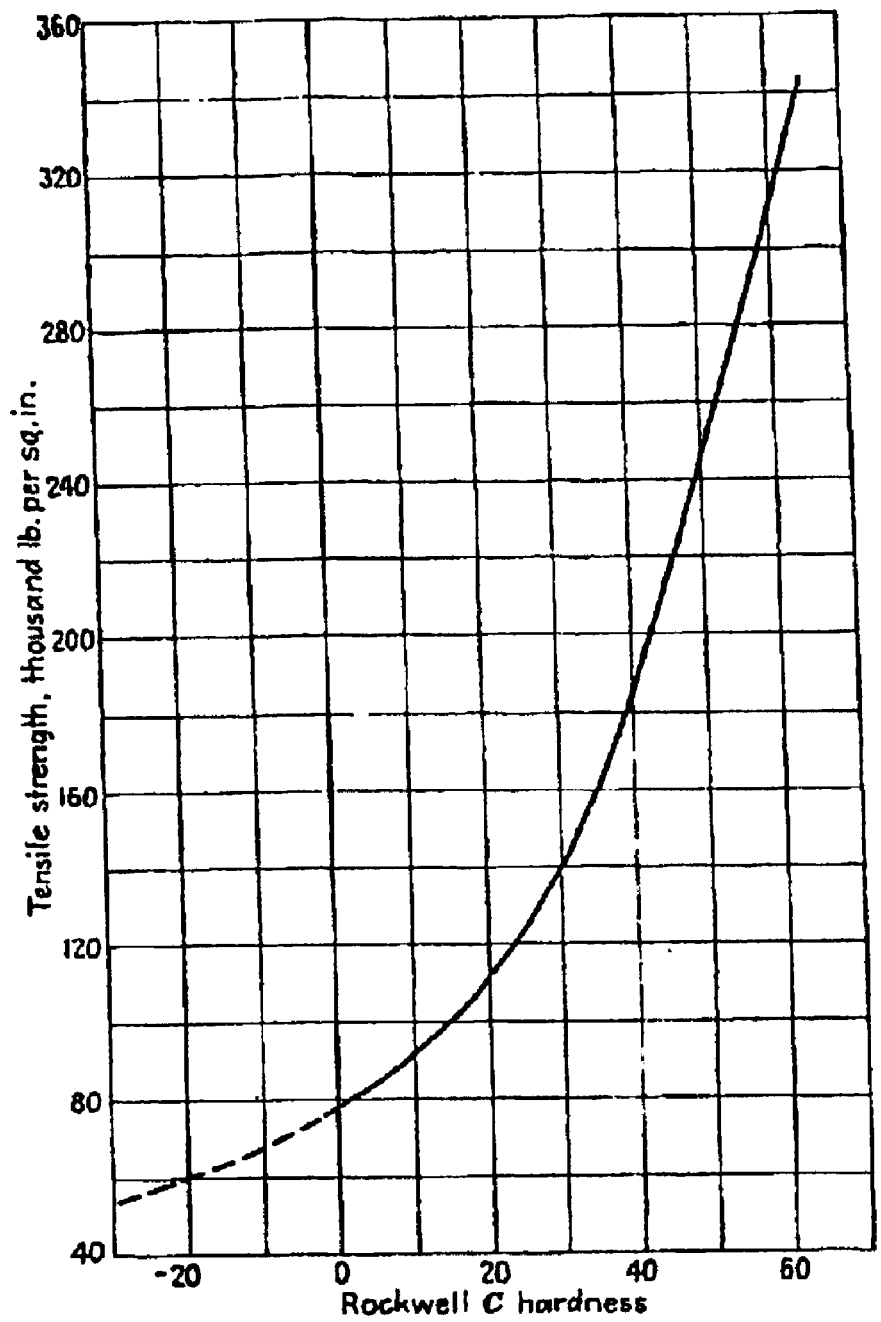
FIG. 4 is graph of tensile strength versus hardness for steels.

The strength of steel is related to its hardness condition. In general, the harder the steel, the higher is its strength. FIG. 4 shows a plot of the tensile strength versus hardness of steel. The maximum hardness that a particular steel can achieve is a function of the amount of carbon in the steel. Whether a steel is at its maximum capable hardness or below that value depends on the heat treating that is done. To achieve a high hardness and high strength, the steel is preheated, austenized, quenched and tempered. The steel is preheated to minimize the residual stresses that will occur in the hardening process. This is typically done up to 1400–1500° F., but varies depending on the type of steel. Austenizing is done by heating the steel to higher temperatures above the critical range such as around 1600° F. which forms an austenite structure in the steel. It is then soaked long enough for the carbides and alloy elements in the steel to dissolve into the solid solution. The exact critical temperature is dependent on the alloys and carbon in the steel. Depending on how the steel is quenched, or cooled, determines the hardness and internal structure that develops. If the steel is cooled slowly, it will develop a pearlite structure, with low hardness and strength. However, if the steel is cooled rapidly, the austenite transforms into martensite, which is fully hard. Intermediate cooling rates will result in a mixed structure with hardness somewhere in the middle. Quenching is done by placing the hot steel into a quenching liquid such as an oil, water or polymer liquid. Cooling steel quickly from austenizing temperature results in higher hardness and strength because the carbon atoms become trapped in highly stressed positions with the other atoms. The interatomic stresses gives rise to the high strength and hardness. Immediately after quenching, the steel is very brittle, contains high residual stresses and is unusable in that condition. The steel is therefore tempered to increase the toughness of the steel by heating it again, to a temperature below the critical range. Tempering also is used to reduce the residual stresses in the steel. The higher the tempering temperature, the greater the toughness but also the greater the loss of hardness and strength. Tempered martensite exhibits the best combination of strength and toughness. One addition to this process that can be done is to normalize the steel prior to hardening. Normalizing is heating the steel above the critical range and allowing it to cool in air. It can be done to promote uniformity in the structure after forging and before quenching and tempering.

Figure 5:
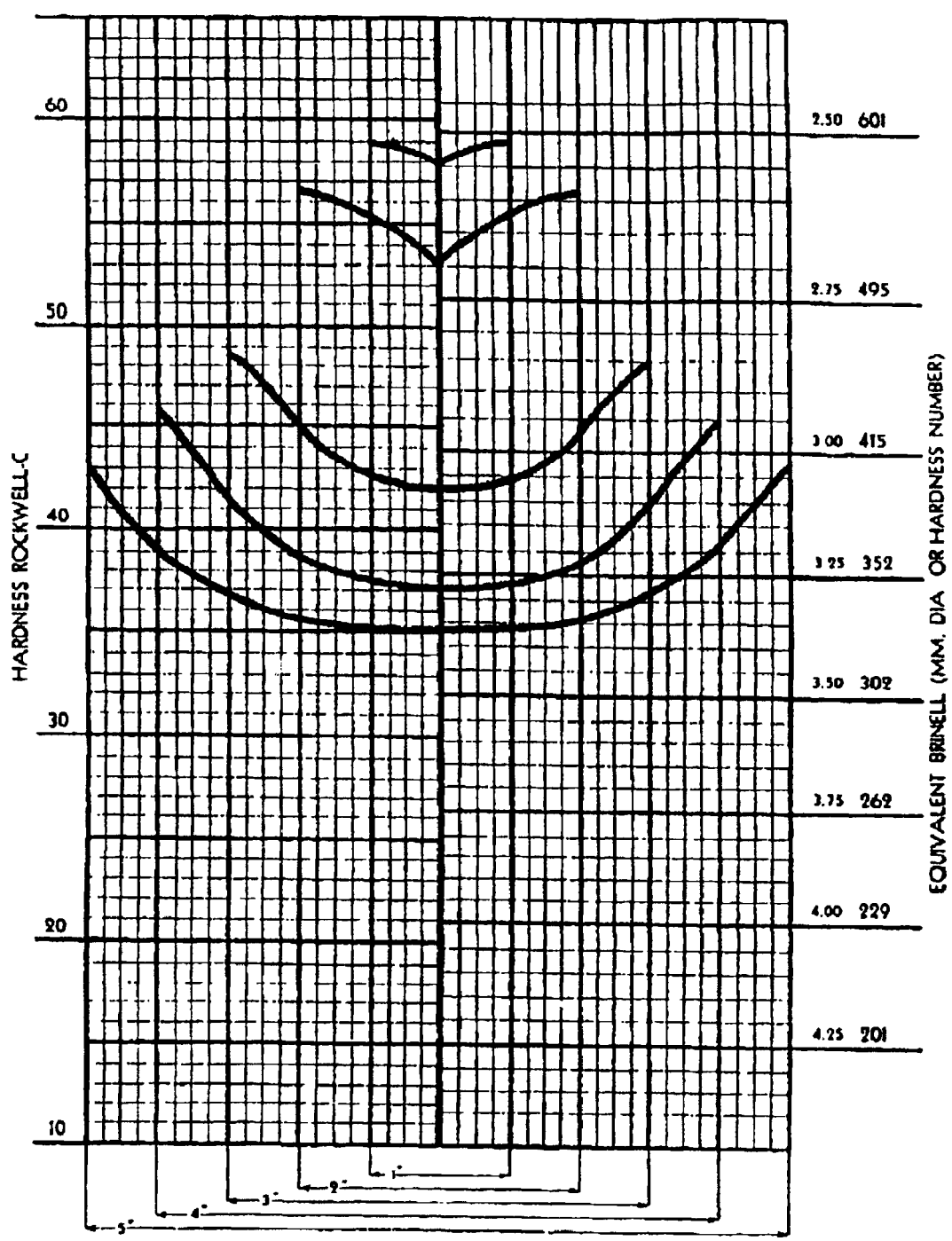
FIG. 5 is a graph of hardness distributions in various diameters of 4140 steel rounds quenched in oil.
Figure 6:
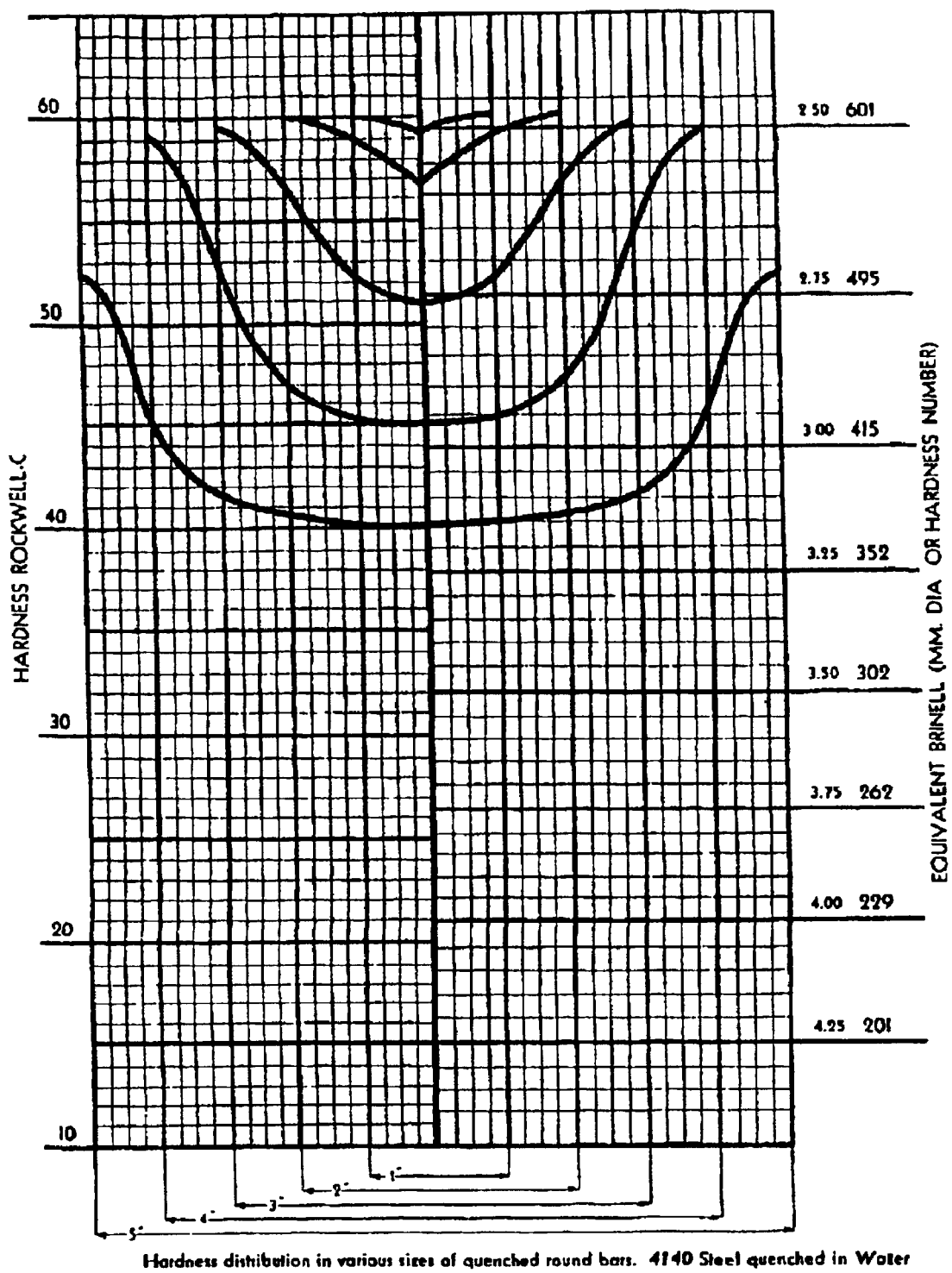
FIG. 6 is a graph of hardness distributions in various diameters of 4140 steel rounds quenched in water.

To achieve the maximum strength and toughness in the steel, the steel is preferably quenched to achieve the highest initial level of martensite before tempering. The steel must therefore be cooled as quickly as possible. When large section parts such as large steel flywheels are quenched, the heat cannot be quickly removed from the entire part. Heat is quickly removed from the surfaces but the heat in the center is trapped and takes longer to escape due to the heat transfer rate. The result is that the center of a large steel flywheel will have a lower hardness and strength than the periphery. Unfortunately, as shown previously, the center is also the portion of the flywheel that is the most highly stressed. This would seem to make a solid steel flywheel a poor design. FIG. 5 shows the hardness distributions in oil quenched 4140 steel rounds with various diameters. It is clear that the strength drops significantly from the outer diameter to the center. The distributions also show that the larger the round the lower the hardness both at the center and the outer diameter. This is due to the increased thermal mass which takes longer to cool. One way to increase the center hardness is to increase the cooling rate by using a more severe quenching that removes heat quicker, such as water. The hardness distributions for the same diameter 4140 steel rounds are shown in FIG. 6 after being water quenched. The result is an increased hardness both at the outer diameters and at the centers. Unfortunately, as the diameter becomes larger, water quenching becomes less effective in increasing the center hardness. The severe quenching can also cause large rounds to crack due to the extreme residual stresses that can develop.

Figure 7:
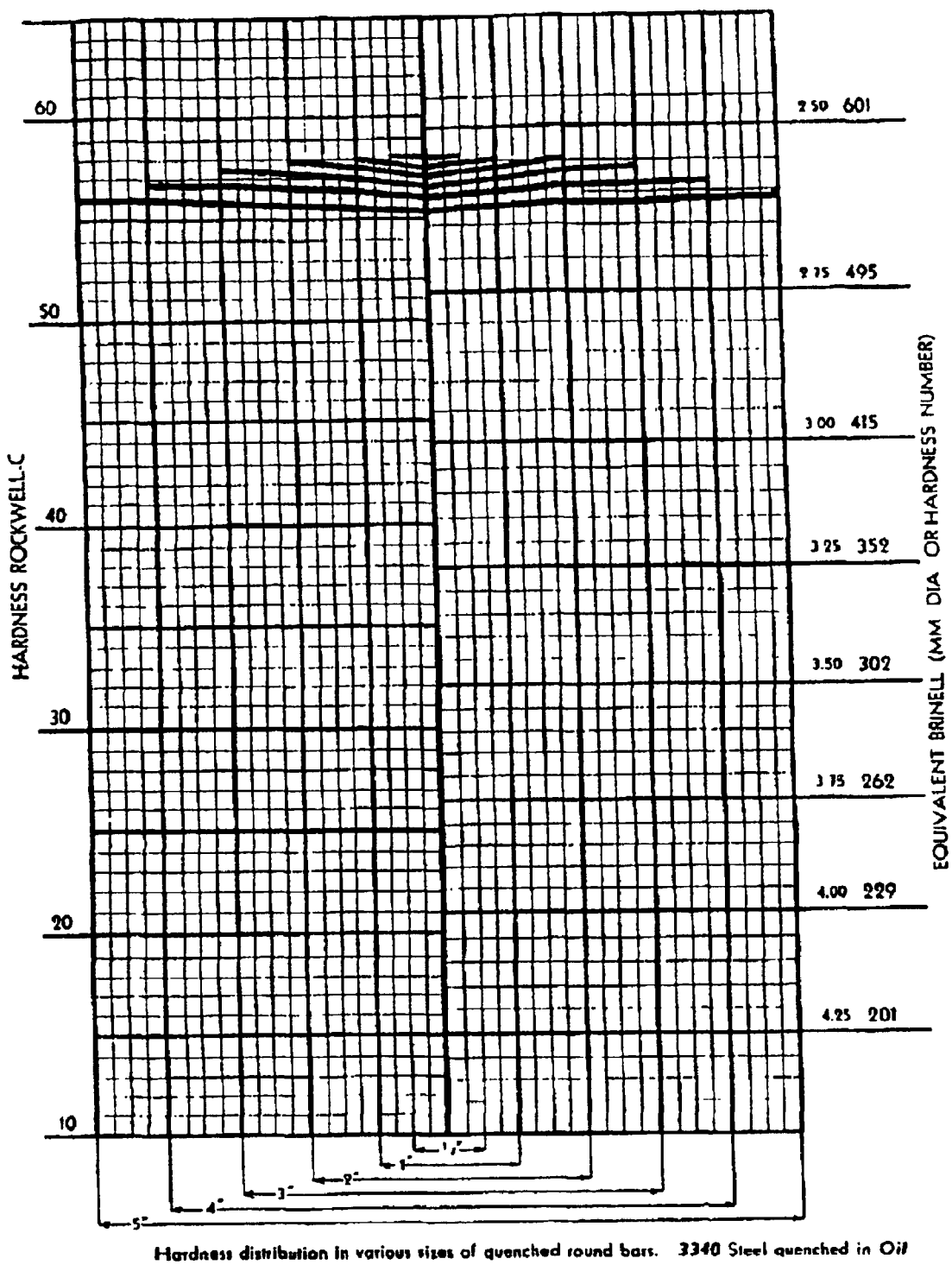
FIG. 7 is a graph of hardness distributions in various diameters of 3340 steel rounds quenched in oil.

The way to increase the center hardness of steel flywheels is by using steels with a high hardenability. Hardenability is the property of steel that determines the depth and distribution of the hardness induced by quenching from austenizing temperature. The maximum hardness that can be developed is a function of the carbon content, however the hardness that is achieved for a given quench severity is determined by the hardenability. The hardenability of a particular steel is controlled largely by the percentages of the alloying elements such as Mn, Si, Ni, Cr, Mo, V, and Co. The alloys effectively allow the steel more time to transform from austenite into martensite. The hardness distributions for the same diameter steel rounds shown previously are shown in FIG. 7. using oil quenched 3340 steel. The result of the higher hardenability from the alloy concentrations in the 3340 is a development of much higher hardness and a much lower drop in hardness in the center. Unfortunately, steel alloys can only allow for so much extra time for martensite formation and if the diameter is too large, the steel will not be able to be cooled fast enough in the center. The invention preferably uses a solid construction for reduced hoop stress; and the steel is an alloy with high hardenability.

Figure 8:
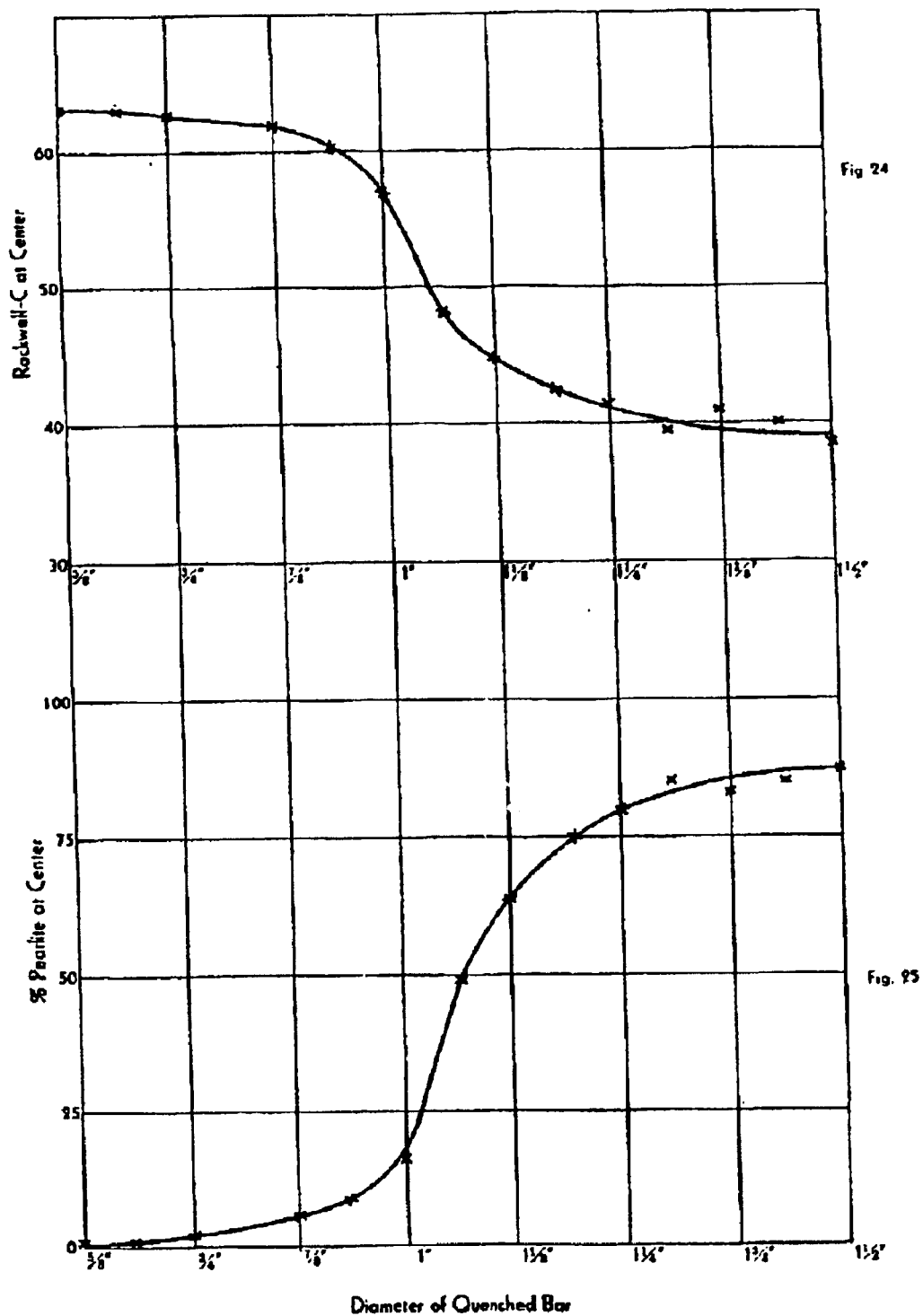
FIG. 8 is a graph of center hardness and pearlite concentrations versus diameter of 2.5" quenched steel rounds.
Figure 9:
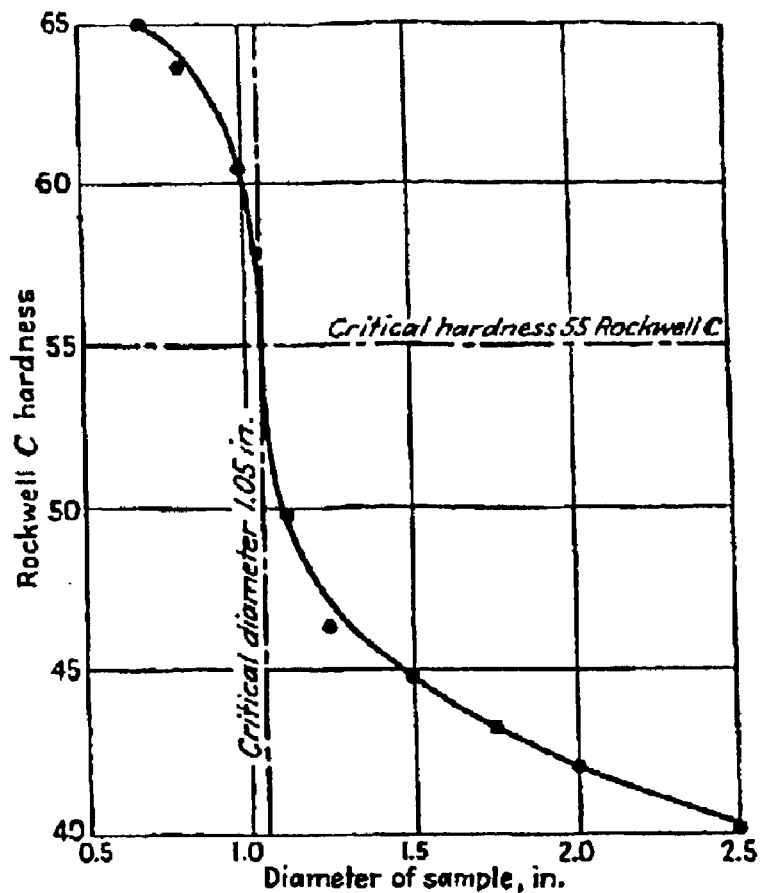
FIG. 9 is a graph of center hardness versus diameter of 1.5" quenched steel rounds with illustration of the critical diameter and hardness.

An interesting phenomenon occurs in hardness distribution of steel rounds. Above a certain diameter for given steel rounds the centerline hardness begins to drop dramatically as the diameter is increased. The slope of the drop off then levels off to some lower level for large diameter rounds. FIG. 8 shows the hardness and percent pearlite concentration at the centerline of rounds versus the diameter for particular quenched steel rounds. From the combination of plots, the steep drop off in center hardness occurs roughly at the same diameter that the center contains 50% pearlite (and by subtraction, also contains 50% martensite). The diameter of round at which the centerline of the round is quenched to yield a 50% martensitic structure is known as the critical diameter. The ideal critical diameter is therefore a property of the steel alloy such that when subjected to a severe quench, will develop 50% centerline martensite. For less severe quenches such as an oil quench, the critical diameter will be less than the ideal critical diameter. The hardness of the steel at 50% martensite structure is known as the critical hardness. FIG. 9 shows the center hardness versus diameter for quenched steel rounds with illustration of the critical diameter and critical hardness. Because the maximum hardness is directly related to the carbon content, so is the 50% martensite hardness.

The phenomenon of the ideal critical diameter can be used to increase the operating speed and energy storage of flywheels. If a steel flywheel is constructed with a limited diameter and as an alternative with a longer axial length, the centerline of the flywheel can be heat treated to a higher hardness and strength. Therefore, it is preferable for the steel alloy flywheel of the invention to be constructed in the shape of a cylinder, having an elongated aspect ratio wherein the length is greater than the diameter, instead of a conventional disk. It should be pointed out that a thin disk could be heat treated to high strength due quick cooling from a limited axial dimension. However, this is thought to have several drawbacks, including an unwieldy diameter, lower rotational speed which reduces motor/generator power, magnetic bearing stability problems from tilting moments; and manufacturing and quality assurance difficulties which will be discussed later. In one embodiment of the invention, the diameter of the flywheel is made less than the critical diameter of the steel alloy. This allows the maximum rotational speed and energy storage per amount of steel and minimizes the flywheel cost.

Figure 10:
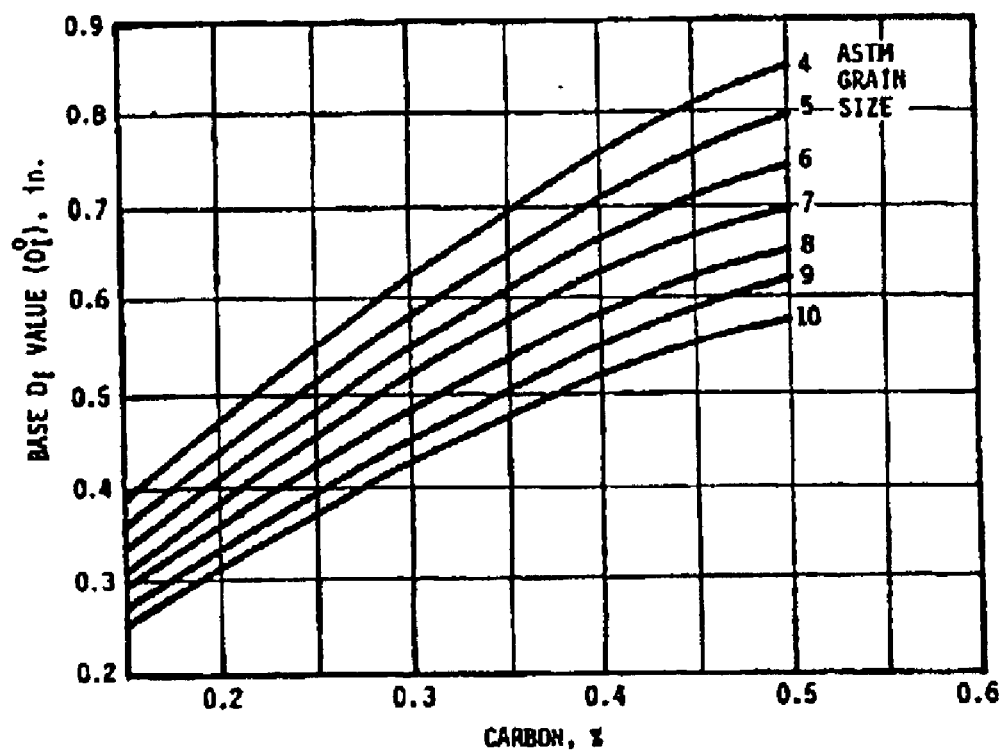
FIG. 10 is a graph of multiplying factors for carbon versus percentage and grain size for use in ideal critical diameter calculation.
Figure 11:
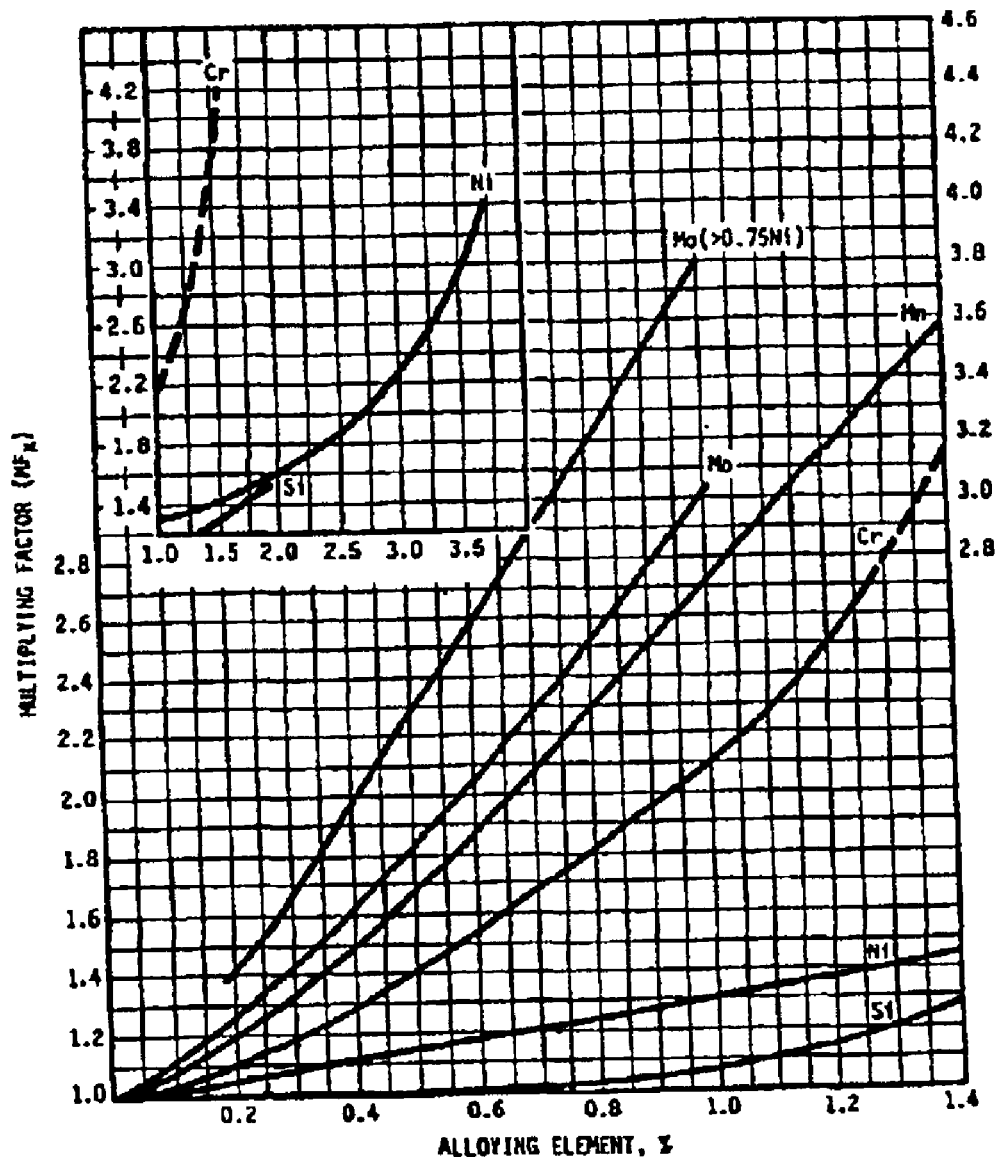
FIG. 11 is a graph of multiplying factors for alloy elements versus percentage for use in ideal critical diameter calculation.

A procedure for calculating the hardenability of different steel alloys is available through standard ASTM A255. The calculation expresses the hardenability in terms of the ideal critical diameter for the alloy steel. For use in designing the solid flywheel cylinder of the invention, the calculation can be used to determine the maximum allowable flywheel diameter. The calculation is based on using multiplying factors for each specific alloy based on the percentages present. All factors for the specific alloys are multiplied together and the product is the calculated ideal critical diameter in inches. A multiplying factor is also used for the carbon in the steel but this factor also depends on the gain size in the steel. FIG. 10 shows the multiplying factors versus percentages of carbon with different grain sizes. A grain size of 7 is typical. The multiplying factors versus percentages for the other alloys are shown in FIG. 11. From the graph, it can be seen that molybdenum is one of the elements that has the largest effect on the hardenability. Nickel increases molybdenum's hardness multiplying effect. Nickel, which is one of the most expensive alloy elements, is also added to steel for the purpose of greatly increasing toughness. The nickel helps increase toughness because it does not form any carbide compounds in the steel and thus stays in solution.

The hardenability calculation in ASTM A255 has limits on the alloy ranges for accuracy and alloy steels have ranges that are specified for the alloy element percentages. For an accurate determination, testing is required but the calculation can be used as a starting point. The alloy percentages and calculated ideal critical diameter ranges are in shown in FIG. 12 for various steels. For some of the steels, the alloys are out of range for the multiplying factors and the calculation is not applicable. Low cost, low alloy steels such as 1018 have very small critical diameters of less than one inch. A medium cost steel with deep hardenability and high toughness is 4340. A similar steel with greatly increased hardeneability is 300M which achieves the larger critical diameter partly from the addition of a large amount of silicon up to 1.8%. The steel is air hardening which means that its typical quenching process is to simply let the steel cool in air. Unfortunately, the cost of the steel is more than double. H11 and other tool steels are also air hardening but have high cost and are also brittle.

From a commercial standpoint, a promising steel for flywheels is 4340 or a more high performance modified version E4340H. The alloy steel is a good choice because it is a common high strength alloy steel. Common use allows the steel to be purchased for reduced cost even with the high nickel and other alloy concentrations. It has a high hardenability, with a high toughness and at moderate cost. 4340 is a preferable steel for use with the invention.

Figure 13:
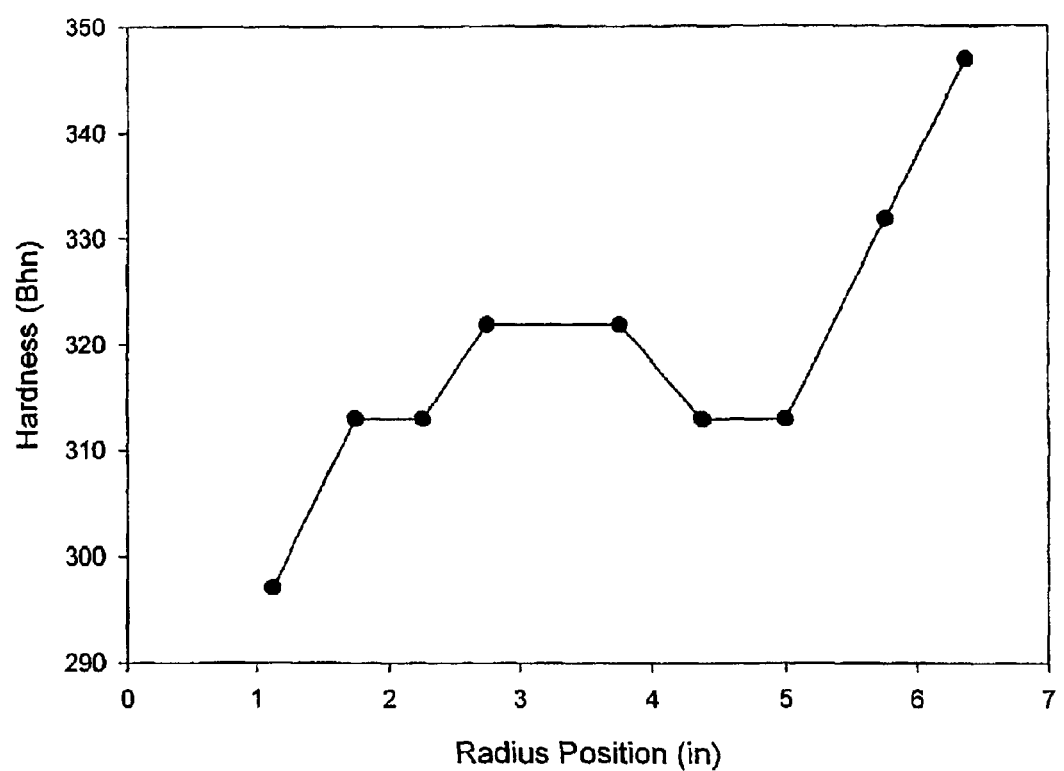
FIG. 13 is a graph of hardness versus radial position for quenched and tempered 4340 steel rounds.

The range of calculated ideal critical diameters for E4340H steel is quite large using the allowable ranges of alloys to make the steel. Actual testing is therefore prudent. Test results for a quenched and tempered cylinder flywheel is shown in FIG. 13. For a 13.5" diameter flywheel, oil quenched and tempered at 14 hours at 950° F., the outer diameter hardness is 360 Brinnell and this drops to 297 Brinnell at 1" radially from the centerline. The ideal critical diameter for the actual steel was only 6.15 inches. The critical hardness for the carbon content in the steel is 388 Brinnell. To achieve better center strength, the percentages of the carbon and alloys can be specified closer to the upper ends of the ranges. This specification of the alloy percentages, or "heat" of the steel, to higher minimum levels can be used to achieve deeper hardening and also insure consistent flywheels. The carbon percentage is preferably greater than 0.40%, nickel is preferably greater than 1.70 % and the chromium is preferably greater than 0.80%. Molybdenum can also be specified greater than 0.25% for deeper hardening. To improve the homogeneity of the steel and increase the transverse properties, the steel can be vacuum arc remelted or electroslag remelted. Both processes make the steel more expensive, but they result in less variation in properties between heats and give better toughness and ductility in the transverse direction. This is the direction of the radial and hoop stresses in the flywheel cylinders. The vacuum arc remelting process also removes much of the gas content in the steel.

To date, commercial steel flywheels have operated at relatively low stresses. However, if the actual use of a flywheel for protection against power interruptions is investigated, it is found that the number of power interruptions requiring full discharges is extremely low. In the case of large flywheels for energy back-up, where a fill discharge requires up to 8 hours of an interruption, the number of full discharges is even lower. It is found that the electric utility grid in the US is 99.9% reliable, which means only 8.8 hours of interruption per year or at worst roughly 1–2 complete discharges for an energy back-up flywheel system. Assuming 2 complete discharges per year, this results in only 40 discharges over a desired 20-year operating life. The majority of power interruptions do not last 8 hours though and in fact it is found that as much as 90% of power interruptions last less than 10 seconds. Therefore, the number of discharge cycles that the flywheel system will encounter will be higher. However, such small discharge cycles and the small number of them, make them nearly inconsequential to the life of a flywheel. The invention is applicable for use in both energy back-up and power ride-through. For ridethrough applications, the flywheel system can experience a much higher number of deep discharge cycles because it typically fully discharges for every 30 second interruption. Even so, the number of cycles experienced over the system life is very small. Despite the extremely low numbers of cycles, a safety margin of significant excess cycle life is preferably used to insure no failures occur.

This remarkably low number of stress cycles, unique with flywheels, is used to increase the energy storage capacity of the invention and hence allow a smaller and lower cost flywheel to be used. Fracture mechanics analysis is employed to safely increase the operating speed. Fracture mechanics takes into account the flaws present in the material to be stressed, the flywheel. Therefore, an added step is taken to measure or test to insure the maximum flaw size is limited to below some certain size. This is preferably done by ultrasonic testing, a procedure for which is given in MIL-STD 2154 for metals. Other methods can also be used to insure that flaw sizes are limited. The extra cost of testing is offset by both allowing increased operating speed and energy storage and by providing assurance about the flywheel safety.

Figure 14:
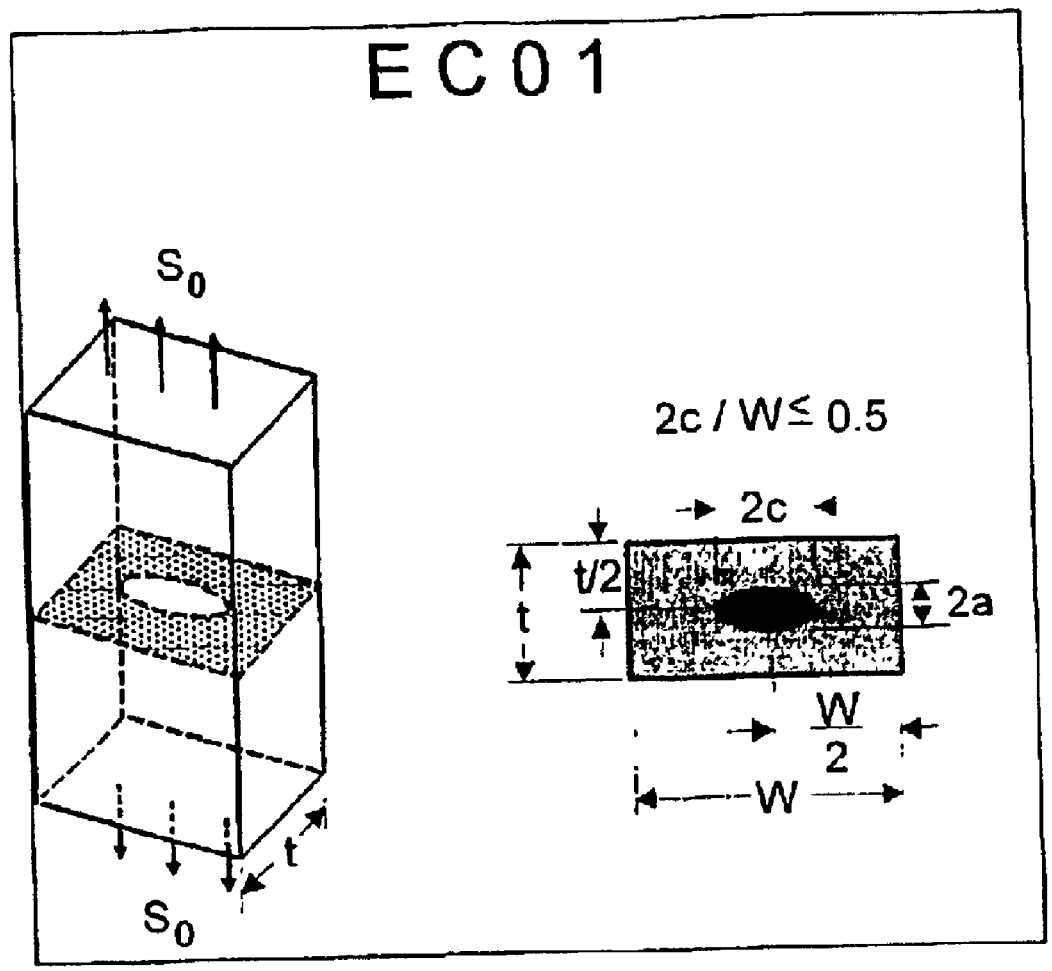
FIG. 14 is a schematic representation of crack propagation from a flaw in a steel flywheel.

The maximum flaw size allowable is used for calculation and certification. The fracture mechanics analysis is preferably done using the NASGROW equation because it allows use of one of the largest existing experimentally verified databases. A computer program called AFGROW, which was developed by the US Air Force for structural life prediction can be used to implement the NASGROW equation. The analysis bases calculations off of data from thousands of tests samples of different materials and conditions. The crack growth in the flywheel cylinder is diagrammed in FIG. 14. The following are the steps required in determining the life of a part of a known material using fracture mechanics. For a flywheel, an embedded flaw in the geometric center experiences the applied maximum hoop and radial stresses ($S_0$). The crack length dimensions are defined by the a-dimension and c-dimension such that the radial load is perpendicular to the direction of crack propagation. The width W is the length of the rotor and the thickness t is the diameter of the rotor. Swapping W and t results in little calculated change as failure is typically found to occur similarly after the crack reaches a certain general size for the material and loading. The type of flaw influences the net-section area and the stress intensity factor K, a measure of the conditions in which an existing crack in the material of a part will become unstable and grow catastrophically. To accurately determine the life of a part the stress history must be accurately known. In the case of a flywheel, the worst possible loading condition is assumed, that is, the unit will operate between the maximum operating stress and no stress.

Failure Criteria: Two different failure criteria are often simultaneously used. The first criterion is the net section failure criterion. For the embedded crack model, this criterion states that the net-section stress is equivalent to the remote applied load divided by the cross-sectional area less the encompassed by the crack.

This net-section stress is then compared to the tensile yield strength to determine whether yielding has occurred and if so the flywheel would be considered to be failed.

The second criterion compares the stress intensity factor K to a measured material property, namely the plane-strain fracture toughness Klc for a plane-strain geometrical condition. The stress intensity factor is used to determine when an existing crack will become unstable and grow catastrophically, that is, when the flywheel will fail. The stress intensity factor as developed by Newman and Raju for an embedded crack is proportional to the applied load and a complex function of the crack geometry, a and c, and the size of the part. This stress intensity factor is valid when a is less than the thickness and when the aspect ratio a/c is between 0.2 and 2.0. Using these parameters a material database can be used to predict the onset of failure.

In cases where fracture material testing data does not exist for the exact conditions that the flywheel is subject, empirical crack growth rate equations that has been extensively verified can be used. In this case, the NASGRO equation has been used. Different elements of this equation were developed by Forman and Newman of NASA, Shivakumar of Lockheed Martin, de Koning of NLR and Henriksen of ESA and was first published by Forman and Mettu]. It is given by:

$$\frac{da}{dN} = C\left[\left(\frac{1-f}{1-R}\right)\Delta K\right]^n \frac{\left(1 - \frac{\Delta K_{th}}{\Delta K}\right)^p}{\left(1 - \frac{K_{max}}{K_c}\right)^q}$$

where N is the number of applied fatigue cycles, a is the crack length, R is the stress ratio, $\Delta K$ is the stress intensity factor range, and C, n, p, and q are empirically derived constants. The program incorporates fatigue crack closure analysis for calculating the effect of the stress ratio on crack growth rate under constant amplitude loading. In general, if you run a fatigue test on alloy steel coupon samples with appreciable toughness (K1C>50) at a stress level just below the yield stress of the material, the coupon samples will survive for at least 50,000 to 100,000 cycles. However, to be able to safely cycle a structure near the same stress level, fracture and the internal flaws must be considered. For this reason, most steel structures are simply designed to operate well below the yield strength of the material (<50%). Non destructive evaluation or flaw size certification adds significant costs in manufacturing, however in the case of steel energy storage flywheels, it has been found that these added costs are less than the cost savings by being able to store more energy. The use of the implementing crack size verification and fracture mechanics thus allows the steel flywheels of the invention to operate at much higher speeds and store significantly more energy.

Figure 15:
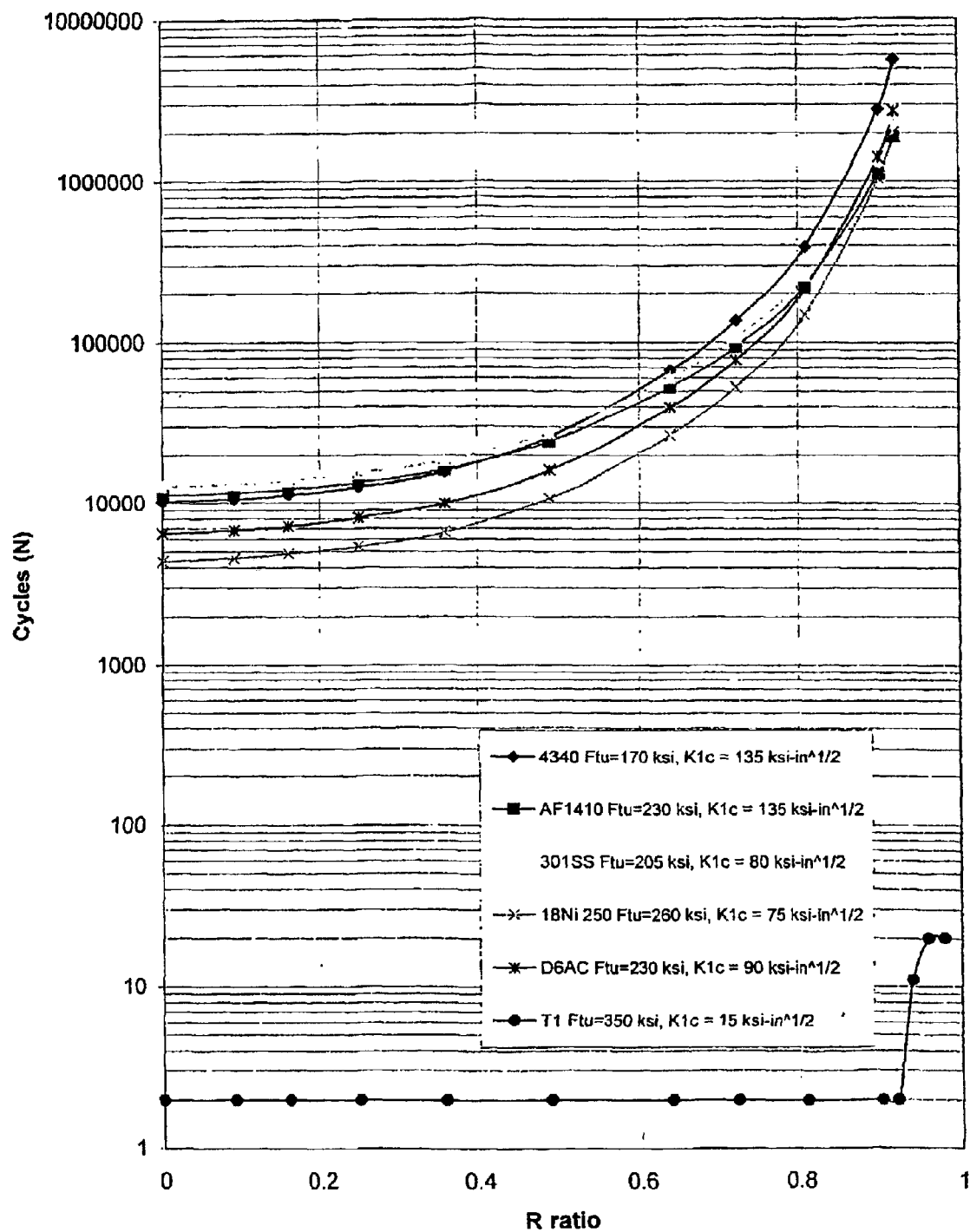
FIG. 15 is a graph of number of cycles before failure versus cycle stress ratio for various high strength steels.

The results of fracture mechanical analysis applied to the cylinder flywheel are given in FIG. 15–20. FIG. 15 shows the number of cycles before failure for flywheels constructed using different alloy steels. For each flywheel, the normal centerline operating speed is 122 ksi, corresponding to approximately 506 meters per second, and the flaw size was limited to $2a=2c=\frac{1}{8}$" with a failure criterion of K>Kmax. Similar results are obtained if the net section failure criterion is applied The R ratio is the ratio of the minimum stress in the discharge cycle divided by the normal operating stress. For maximizing the energy storage capacity of a flywheel, the system is preferably extracting as much energy as possible when required. Thus discharge down to roughly 10% of the energy is preferable. Because the stress is directly proportion to the stored energy, this results in an R ratio of 0.1. Other R ratios would also work. From the results, it is clear that the most fatiguing cycles are the ones with the greatest discharges and that flywheels are capable of much larger numbers of small power interruptions that do not cause significant discharging, approaching 1 million for the conditions chosen. Another important fact to notice is that the steel that has the highest strength, T1 hardened to 350 ksi ultimate strength, has only a 2 cycle life. The cause for the low cycle life is the very low toughness that does not stop crack propagation. It is desirable that steel used for the invention have a plane strain fracture toughness, K1c, of at least 50 ksi-in^1/2 and more preferably above 100 ksi-in^1/2.

Figure 16:
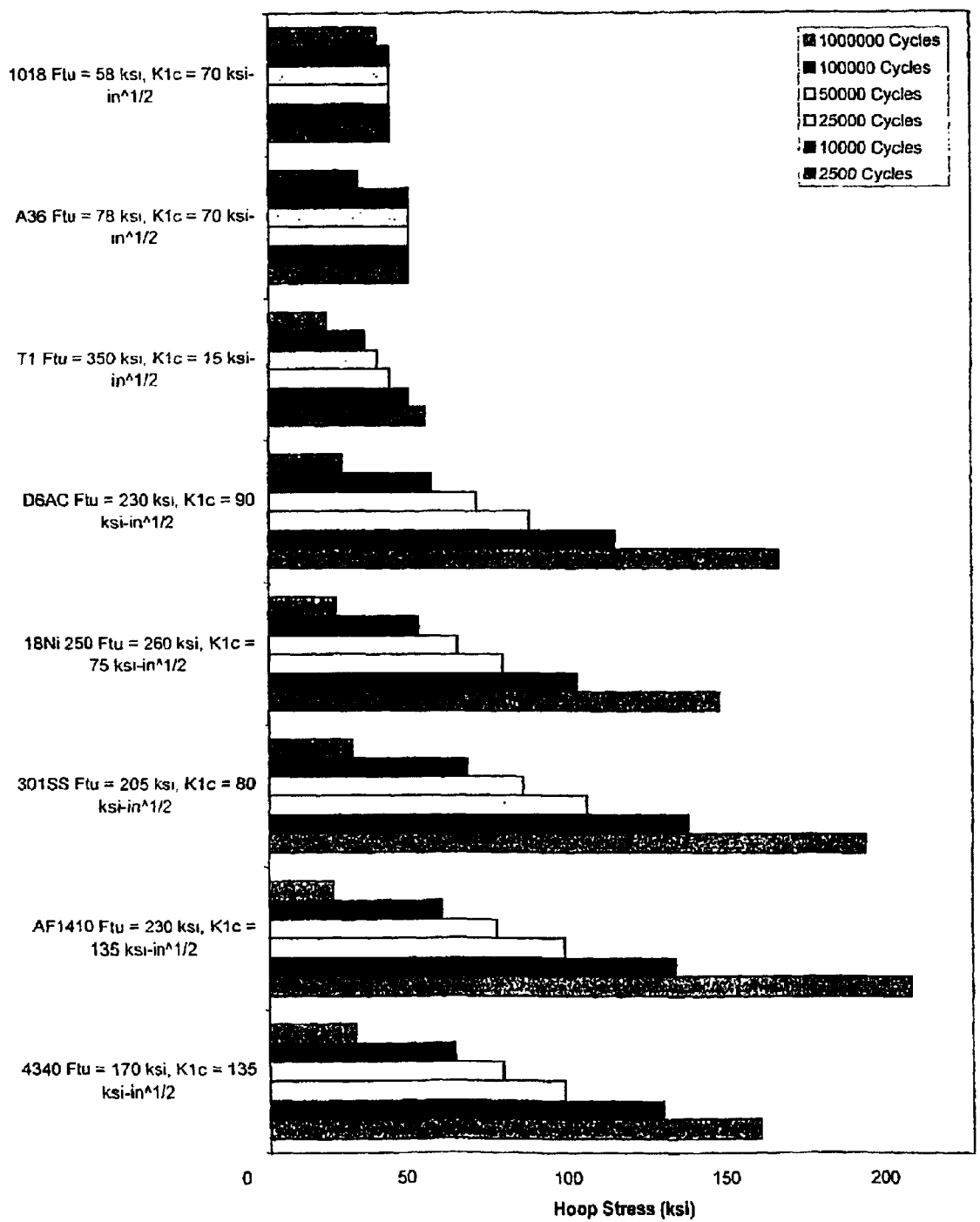
FIG. 16 is a bar graph of maximum hoop stresses that cause failure after different numbers of cycles for different materials.

A chart showing the maximum operating stresses that cause failure with different cycle lives for different materials is shown in FIG. 16. The K>Kmax failure criterion is used along with a $2a=2c=\frac{1}{8}$" maximum flaw size. Similar results are obtained if the net section failure criterion is applied. The low cost steels, 1018 and A36 show nearly similar hoop stress levels for 2500 to 100000 cycles due to operation very close to the yield strength of the materials. High strength T1 steel surprisingly performs very poorly due to the very low fracture toughness. Stainless steel 301 is shown capable of high performance however is not practical because it is hardened only through work hardening and not heat treating. The best performance for low cycle numbers is AF1410, however it is extremely expensive and the slight improvement over 4340 does not warrant the extra expense. What is clear from the bars of all the high strength and toughness steels is that the operating hoop stress can be dramatically increased according to fracture mechanics if the number of cycles is small.

Figure 17:
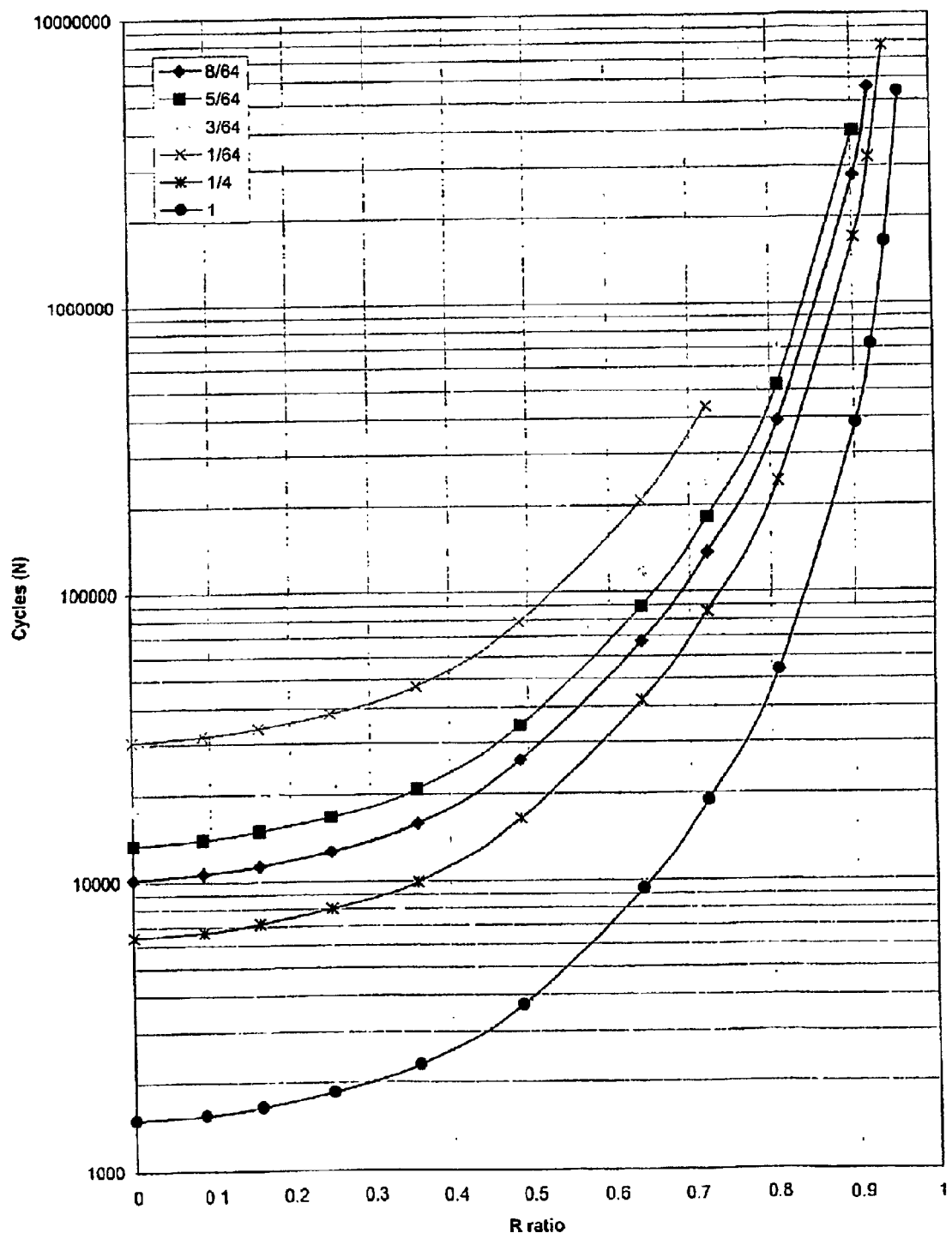
FIG. 17 is a graph of the number of cycles before failure versus cycle stress ratio for 4340 steel flywheels with different internal flaw sizes.

If 4340 steel is chosen for fabrication of the invention and heat treated to a 170 ksi centerline ultimate strength, FIG. 17 shows the number of cycles before failure versus R ratio for different internal flaw sizes with an operating stress of 122 ksi. A 1" flaw size performs very poorly and cycle life increases with reduced flaw size. However, the increase in life from reduction of the flaw sizes becomes less significant as the flaw sizes are reduced. Certifying material to smaller flaw sizes increases costs so a balance must be made. A $\frac{1}{8}$" flaw size certification is preferable for a good balance of performance to cost. Because the stress is highest at the center of the flywheel, the flaw size certification could also be adjusted to account for that by specifying the flaw size limit at of the material at diameters less than 40% of the outer diameter of the flywheel. Positions greater than 40% of the outer diameter have hoop stresses that are approximately 10% lower.

Figure 18:
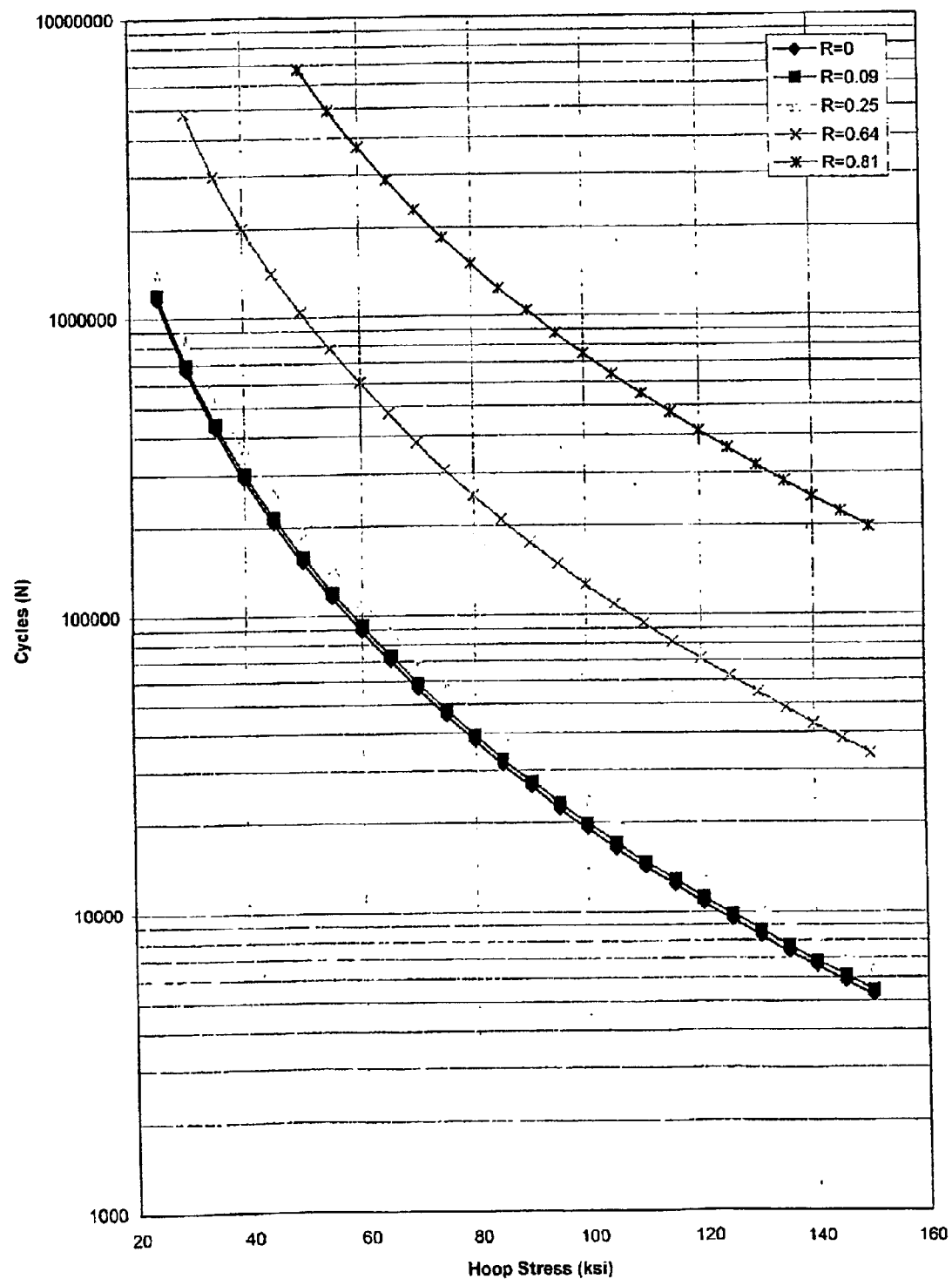
FIG. 18 is a graph of the number of cycles before failure versus maximum operating stress for 4340 steel flywheels with different stress cycle ratios.

FIG. 18 shows the number of cycles before failure versus the maximum operating stress for 170 ksi ultimate tensile strength 4340 steel with different stress ratios. From the graph, it would appear that if the R ratio is increased to give extra cycle life, it could be possible to extrapolate the curves to the right and allow for an increase in the operating stress. However, this is not the case because the upper limit on the stress is bounded by the tensile yield strength of the material. Additionally, some factor of safety is preferably kept between the operating stress and tensile yield strength. For well-hardened steels, the tensile yield strength is usually around 90% of the ultimate tensile strength. For steels heat treated to have a higher pearlite structure, the tensile yield strength can drop to roughly 80% of the ultimate tensile strength.

Figure 19:
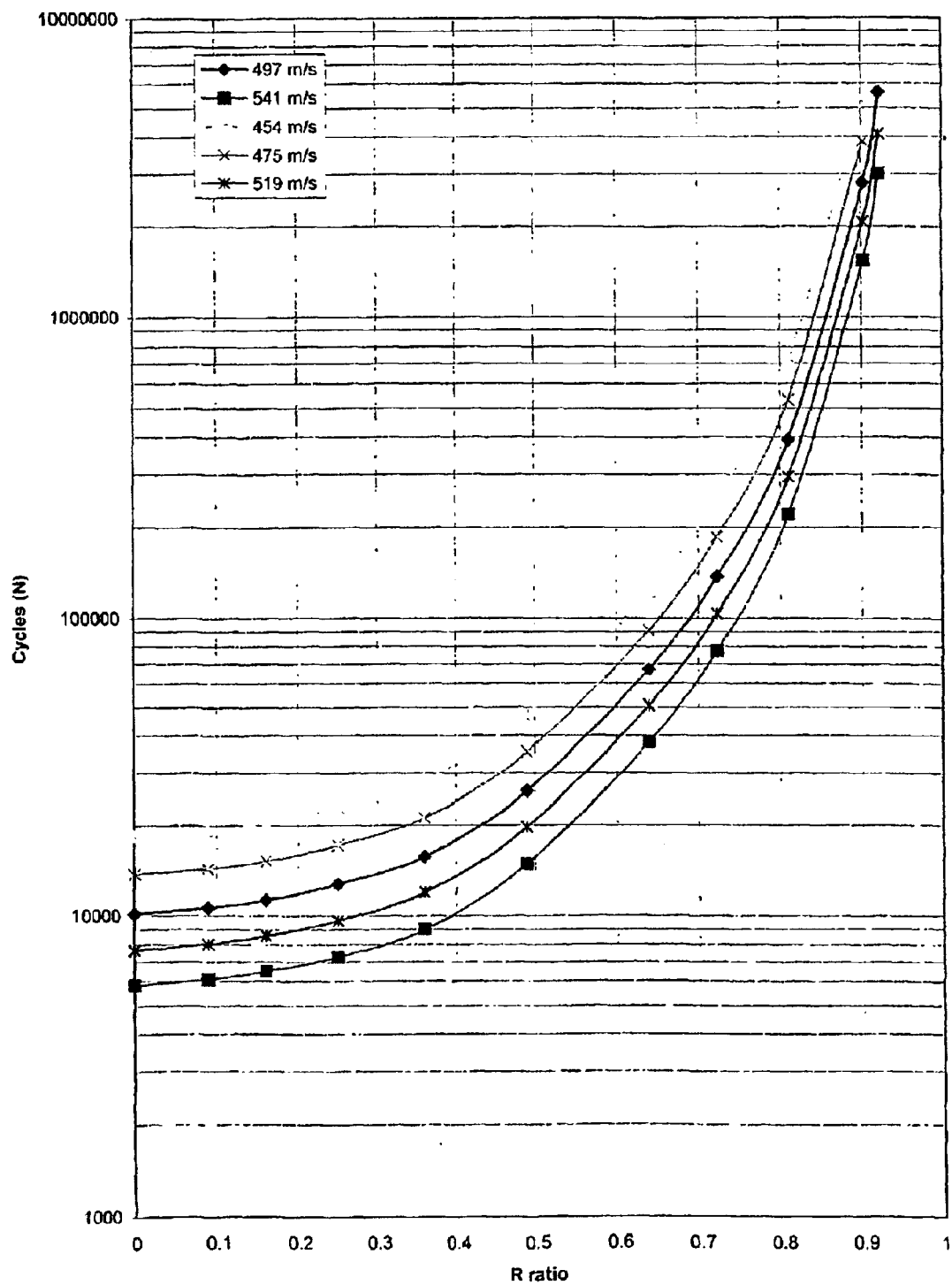
FIG. 19 is a graph of the number of cycles before failure versus cycle stress ratio for steel flywheels with different operating tip speeds.

The number of cycles before failure versus stress ratio for 170 ksi ultimate tensile strength 4340 is given for various flywheel speeds in FIG. 19. At 519 meters per second, the flywheel can achieve roughly 6000 cycles and at 497 m/sec it can survive 10000 cycles. To insure the safety of the flywheel system the variability of the fracture data is taken into account, thus reducing the calculated number of cycles before failure. For a flywheel calculated to achieve a 10000 cycle life, the cycle life that you will actually allow is roughly cut in half to around 5000 cycles.

Figure 20:
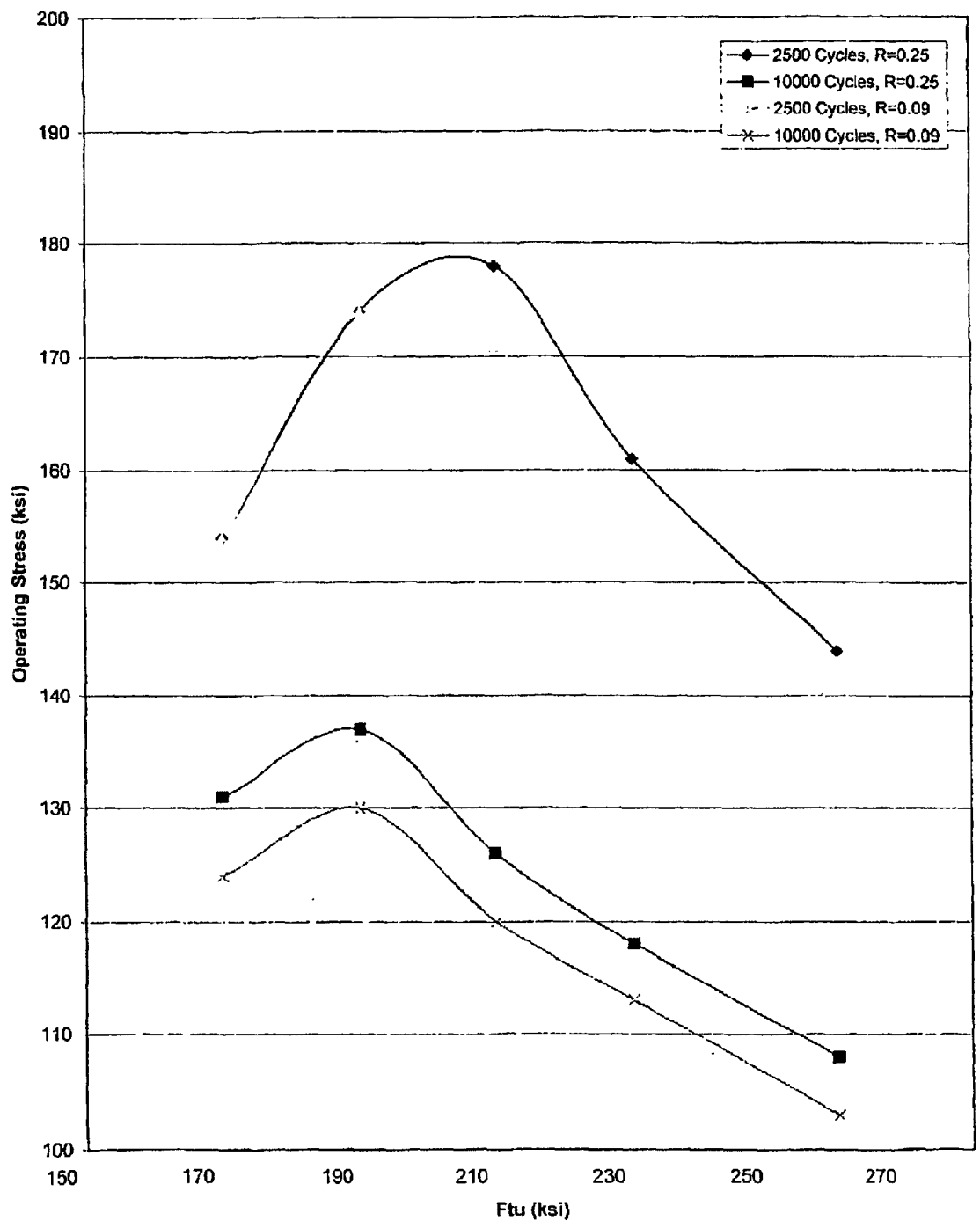
FIG. 20 is a graph of the maximum stresses for 4340 steel flywheels versus centerline ultimate strength for both 2500 and 10000 cycles.

As mentioned previously, the combination of the toughness and strength of the steel is most important to achieving the highest allowable stress level and highest amount of energy storage with the flywheel. FIG. 20 shows the maximum operating stresses in 4340 steel flywheels heat treated to different strengths versus the ultimate tensile strength values. The R ratio is 0.09 and 0.25 and the flaw size is limited to $2a=2c=\frac{1}{8}$". The plot shows that the higher the ultimate strength above a certain value, the allowable operating stress actually drops due to the loss in toughness. The tempering process should thus be conducted at an increased temperature to reduce the ultimate strength and increase the toughness. For a 4340 flywheel with discharge ratio of 0.09, increasing the ultimate strength of the flywheel at the centerline to greater than around 190 ksi is disadvantageous as it will reduce the allowable operating stress. A centerline hardness of the critical hardness for 4340 steel corresponds to approximately 380–405 Brinell and an ultimate strength of 185–205 ksi. The 190 ksi ultimate strength would correspond to a minimum martensitic structure of about 40% however tempering of higher concentrations will yield the same hardness. On the low end, the steel preferably has a centerline hardness of at least 229 Brinell for an ultimate strength of 110 ksi and more preferably is greater than 311 Brinell for an ultimate strength of 150 ksi.

Figure 21:
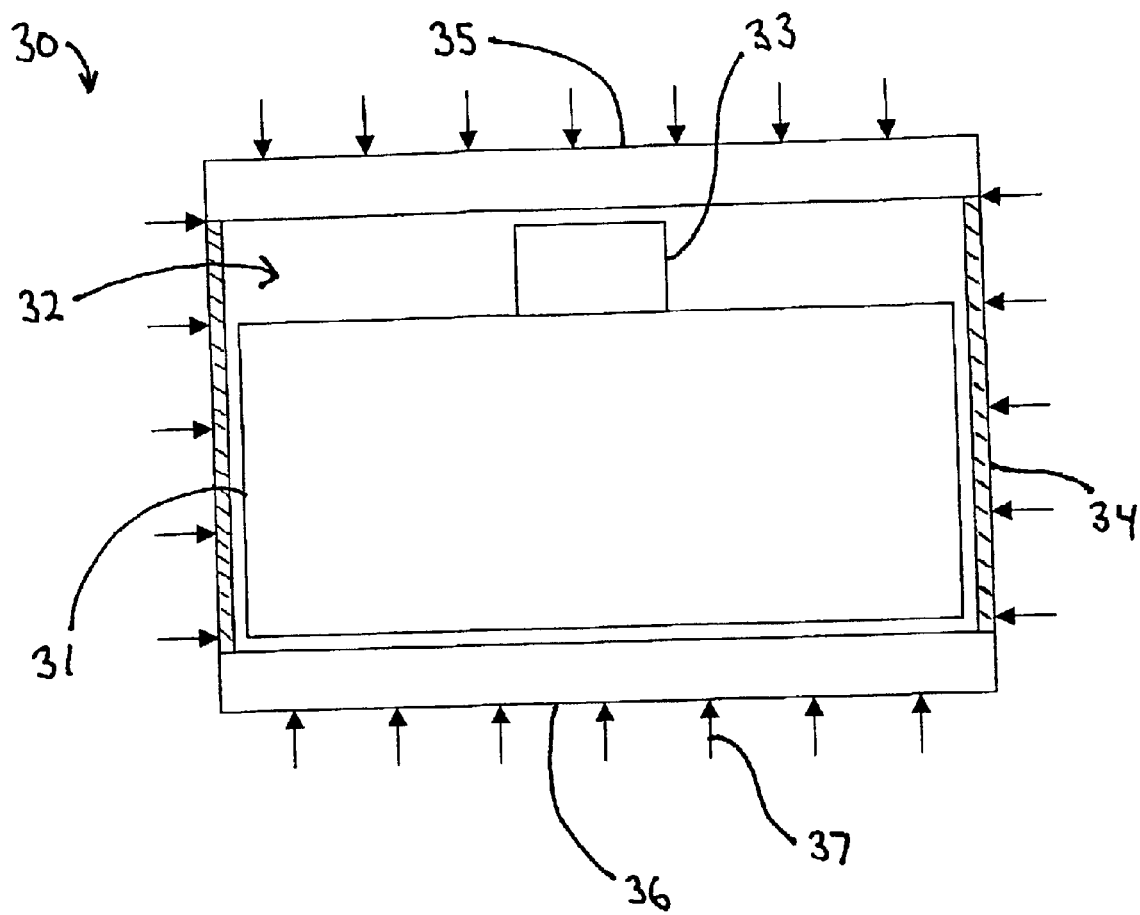
FIG. 21 is a schematic representation of prior art flywheel system vacuum container.

Besides allowing for lower flywheel costs by increasing the energy storage capability. The use of a cylinder flywheel also has other advantages. FIG. 21 shows a schematic representation of a flywheel system with a disk flywheel, not in accordance with the invention. The flywheel system 30 consists of a flywheel 31 greater than the critical diameter. The flywheel 31 operates in a vacuum to reduce aerodynamic drag. A motor/generator 33 is used to accelerate and decelerate the flywheel 31. Other designs of disk flywheel-motor/generator systems exist and one other such type is show in U.S. Pat. No. 5,969,457. One other disadvantage with the use of a steel disk flywheel is in the design and cost of vacuum container. The vacuum 32 is contained by a tube 34 and upper and lower plates 35 and 36. Atmospheric pressure 37 exerts tremendous forces on the tube 34 and plates 35, 36. The tube can be made thin wall because of the curved construction. However, the upper and lower plates 35, 36 must be made very thick to resist the forces. If the plates 35, 36 hold the bearings, not shown, the plates must be made even thicker to limit deflection. This increases the cost and weight of the flywheel system. The plates could be made domed to reduce deflection but this also adds cost. This problem is more significant for use with steel flywheels than composite flywheels because composite flywheels are in the shapes of rings and a central stationary can sometimes be employed. Steel flywheels, however, cannot have a central hole as previously explained. U.S. Pat. No. 5,969, 446 shows a composite flywheel system with central shaft.

Figure 22:
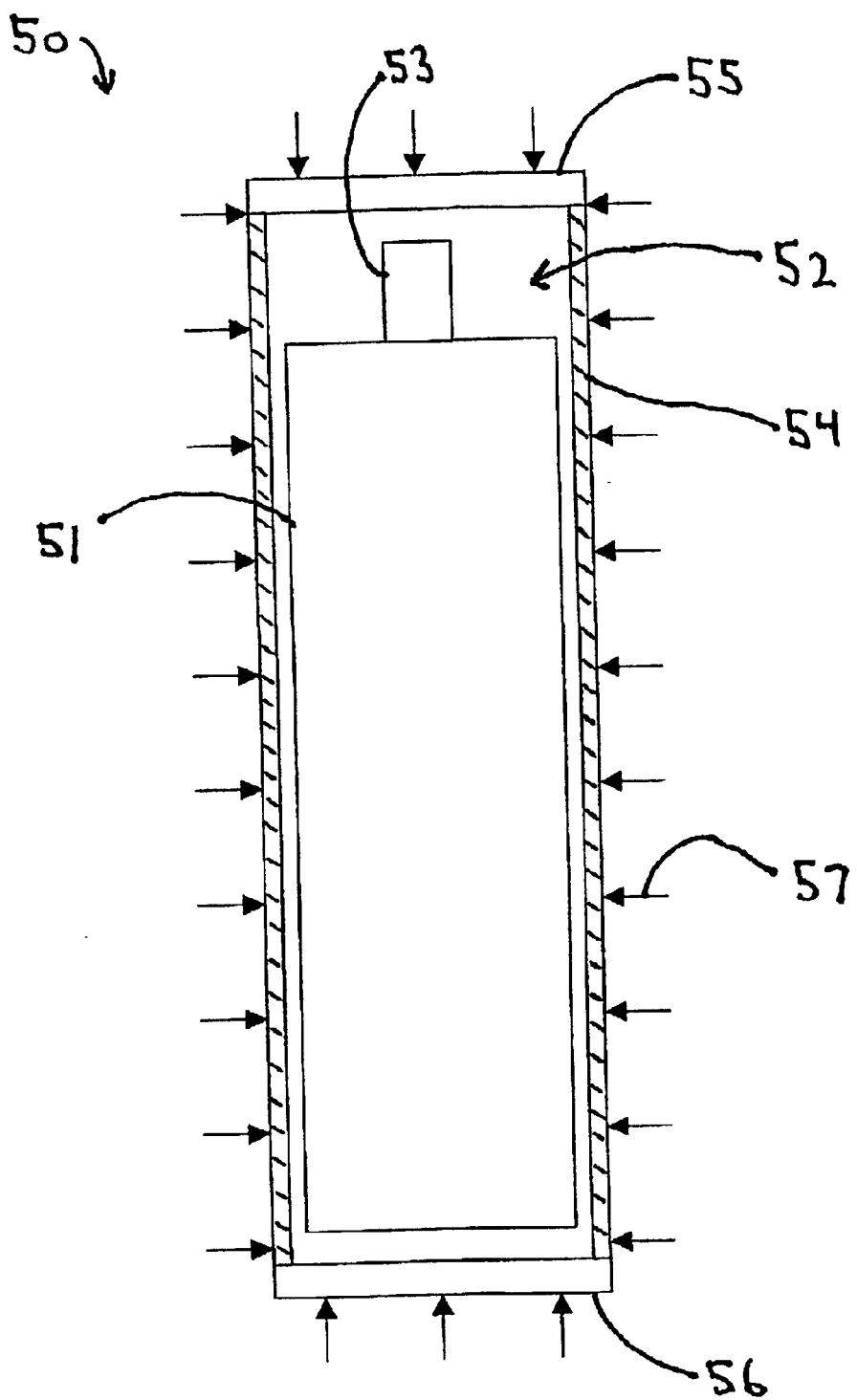
FIG. 22 is a schematic representation of a flywheel system vacuum container in accordance with this invention.

FIG. 22 shows a flywheel energy storage system 50 in accordance with the invention. The system 50 uses a solid steel cylinder flywheel 51 with diameter equal or less than the critical diameter of the steel used for construction. The flywheel spins in a vacuum 52 to reduce aerodynamic drag. A small molecule gas like helium could be used instead of the vacuum 52 but this will increase the drag. The flywheel is accelerated and decelerated using a motor/generator 53 and many types are well known in the art. The vacuum is maintained in a thin walled tube 54 with relatively thin upper and lower low cost plates 55 and 56. Because of the smaller diameter of the plates 55, 56, the atmospheric pressure 57 results in much lower bending stresses and deflections.

The use of a cylinder flywheel as has advantages over a disk flywheel in the use of passive radial magnetic bearings. A schematic representation of a magnetic bearing system using cooperative passive radial magnetic bearings is shown in FIG. 23A. A magnetic bearing system 60 is comprised of a flywheel 61 subjected to gravitational force 62 and supported on upper and lower passive magnetic bearings 63, 64. The upper bearing 63 exerts an upper axial attraction force 65, radial centering forces 66 and an inherent unstable tilting moment 69. The bottom bearing 64, also exerts an upper axial force 67, radial centering forces 68 and an inherent unstable tilting moment. An active axial magnetic bearing, not shown, is used to position the flywheel axially and overcome the axial instability. In this lower passive bearing also works on an vertical facing surface and thus generates a vertical lifting force 67 that cooperates to axial support the flywheel weight 62. For operation at an equilibrium point, the vertical forces 65, 67 both add together to equal the weight of the flywheel 62 and the average axial force from the bearings would be equal to one half the flywheel weight 62. The unstable tilting moments 69, 70 are each overcome by the radial center forces 67, 65 at the opposite ends of the flywheel 61. Having a longer length, such as with a cylinder shape of the invention, the unstable tilting moments are more easily overcome. It has been found that, for a particular passive bearing design, having a cylinder length of greater than roughly twice the diameter is preferable for stable levitation.

The magnetic bearings supporting the flywheel can also be opposing. FIG. 23B shows a schematic representation of a magnetic bearing system using opposed passive radial magnetic bearings. The bearing system is comprised of a flywheel 81 with weight 82 that is supported by upper and lower passive magnetic bearings 83, 84. The upper bearing 83 exerts an upward attractive force 85, radial centering forces 86 and an unstable tilting moment 89. The lower magnetic bearing exerts a downward axial force 87, radial centering forces 88 and an unstable tilting moment 90. An active axial magnetic bearing, not shown, is used to position the flywheel axially and overcome the axial instability. The upper and lower passive bearing axial forces oppose each other, thus making axial support of the flywheel weight more difficult. For this reason, this design of magnetic bearing system has not been used for support of large mass flywheel systems. The bearings would require use of more permanent magnet material so that the upper bearing 83 can lift more of the flywheel weight 82. Either bearing method can be employed with the invention, however the opposing system 80 is found to be preferable for simplifying the construction and allowing increased radial stiffness. The construction of the bearings 83, 84 can be simplified because they can act on the ends of the flywheel 81 and preferably be integrated directly into the ends of the cylinder. The radial stiffness generated a passive radial magnetic bearing, for a given bearing design, is proportional to the axial attractive force generated by the passive bearing. The axial forces 85, 87 to not have to add up to approximately equal the flywheel weight 82. The axial forces 85, 87 can be made larger if desired by having the opposing construction thereby increasing the passive radial centering forces 86, 88.

Figure 24:
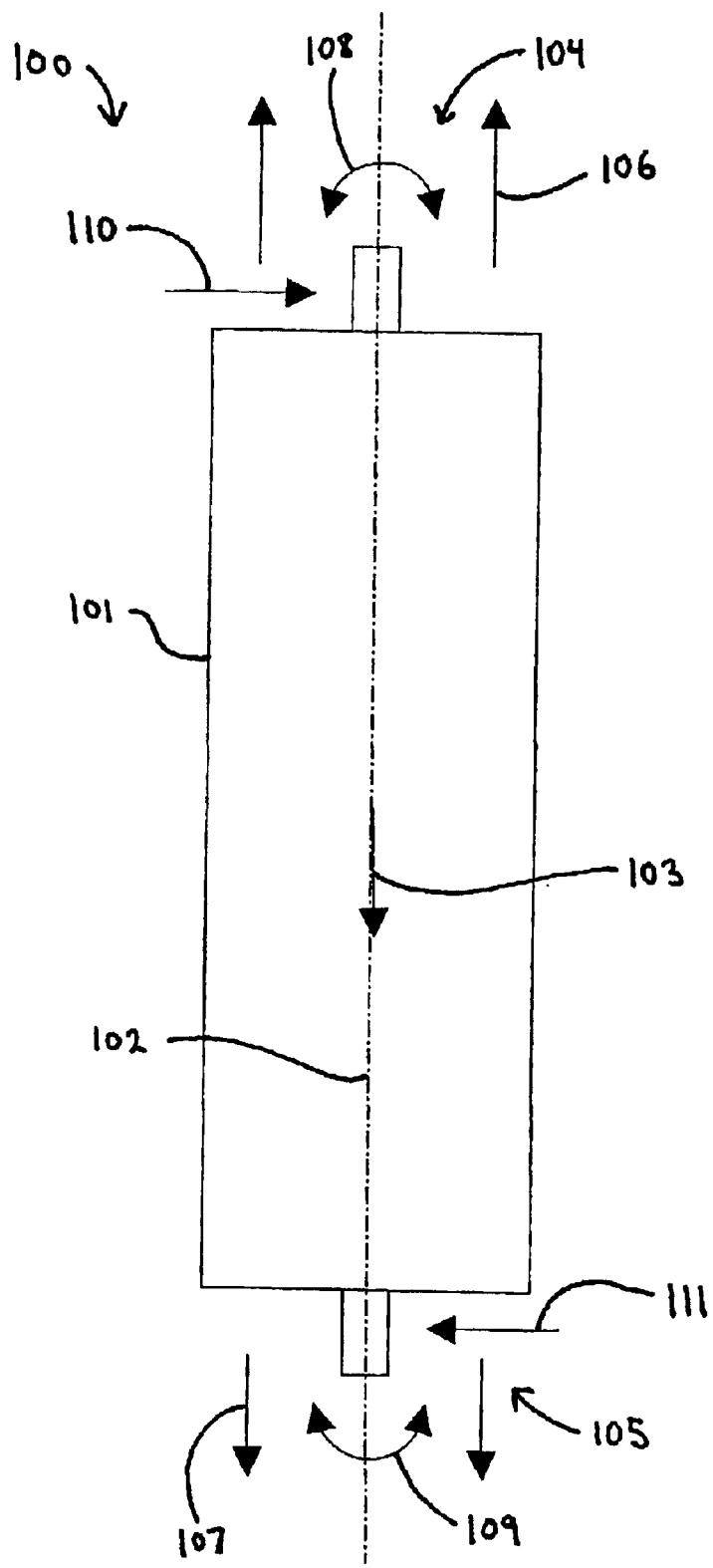
FIG. 24 is a schematic representation of a magnetic bearing system showing radial loading resulting from tilted operation.

The radial stiffness of the passive radial magnetic bearings supporting the flywheel is preferably made relatively higher for passive bearings to make operation more robust, FIG. 24 shows a schematic representation of a magnetic bearing system showing radial loading from tilted operation. The magnetic bearing system 100 is comprised of a flywheel 101 with centerline 102 and acted upon by gravitational force 103. The flywheel 101 is supported by upper and lower passive radial magnetic bearings 104, 105, and an active axial magnetic bearing, not shown, maintains axial stability. The upper magnetic bearing exerts upward axial force 106, radial centering force 110 and unstable tilting moment 108. Like wise, the lower magnetic bearing 105 exerts a downward axial force 107, radial centering force 111 and unstable tilting moment 109. Because the system is inadvertently installed tilted with a centerline 102 tilted with respect the gravity force 103, the upper and lower bearings 104, 105 carry increased radial loads 110, 111. Increasing the radial stiffness of these bearings allows levitation with increased system tilting. The passive radial stiffness is also used to overcome the radial and or tilt moment instability generated by the motor/generator or active axial magnetic bearing, both not shown. It has been found that for systems employing radial gap motor/generators, the radial magnetic bearing stiffness of the bearing closest to the motor/generator is preferably about twice the radial negative stiffness generated by the motor/generator or greater.

Figure 25:
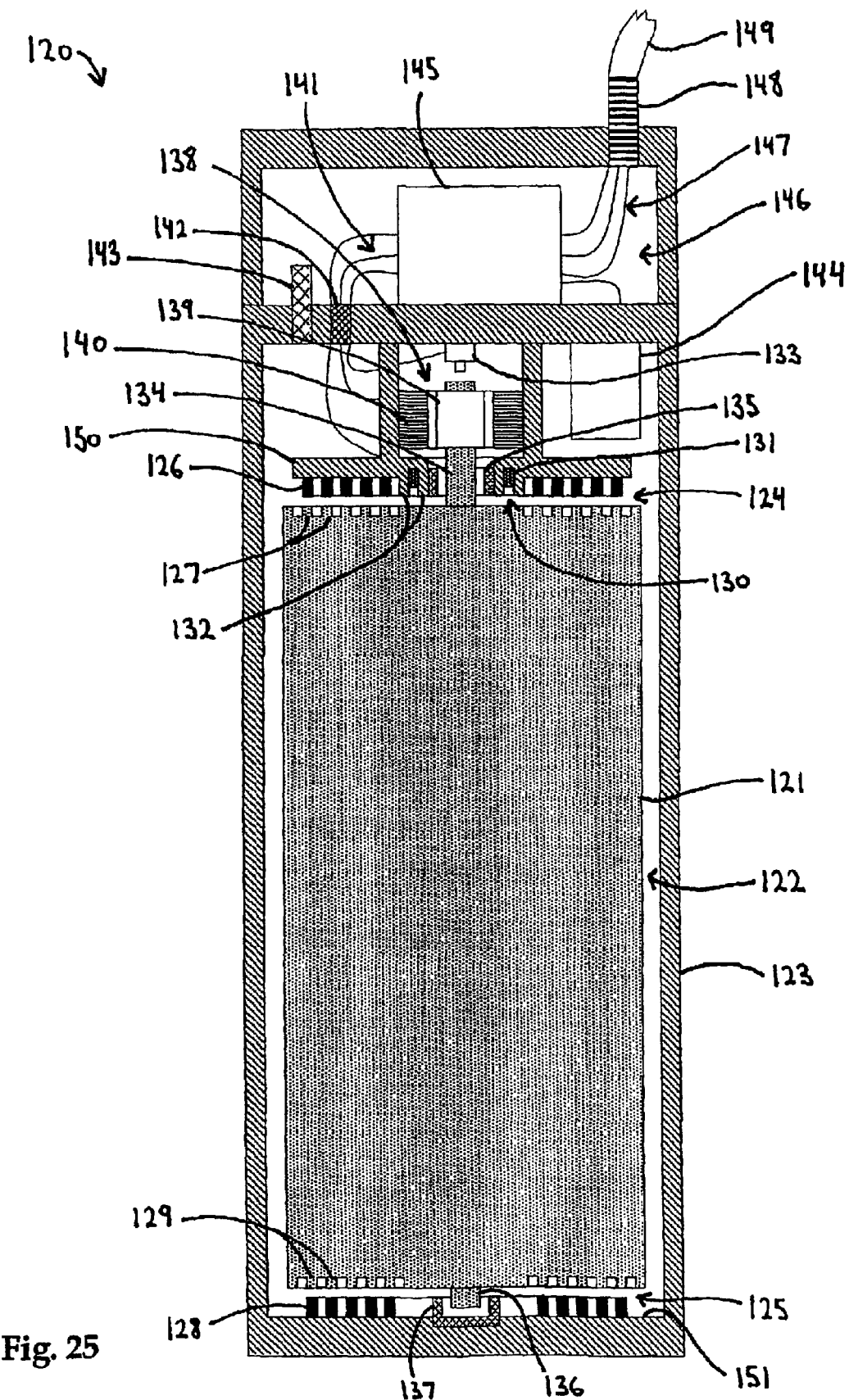
FIG. 25 is a schematic elevation of a flywheel energy storage system in accordance with this invention.

A preferred configuration of a flywheel energy storage system in accordance with the invention is shown in FIG. 25. The flywheel system 120 is comprised of a solid alloy steel cylinder flywheel 121 with high centerline strength and toughness that rotates inside a container 123 that is maintained at low pressure 122 for reduction of aerodynamic drag. "Low pressure" means below atmospheric pressure and includes such low pressures such as are commonly used in evacuated or vacuum chambers for flywheel energy storage systems. The flywheel is supported for rotation on upper and lower passive radial magnetic bearings 124, 125 and as one preferred embodiment are integrated directly into both axial ends of the solid steel flywheel 121 for low cost and compact construction. The upper radial magnetic bearing 124 is comprised of axially magnetized permanent magnet rings 126 arranged preferably with radially alternating polarities. The permanent magnets 126 are attached to the upper stator structure 150 and they generate passive radial centering along with a vertical lifting force by attraction with concentric and cooperating pole rings 127 cut directly into the axial face of the flywheel 121. This design of passive radial magnetic bearing eliminates the need for rotating permanent magnets that have low tensile strength.

The permanent magnets 126 are preferably high energy product type such as NdFeB for generating maximum stiffness and lifting force. The number of bearing rings is chosen to provide adequate stiffness for the given system. The lower passive radial magnetic bearing 125 uses the same construction. Axially magnetized permanent magnet rings 128 attached to the stationary bottom plate 151 of the container 123 cooperate with pole rings 129 cut into the bottom axial face of the flywheel 121. In this design shown, The axial stability for levitation is achieved using only 1 active axial actuator bearing 130 that is located at the top. The active bearing maintains the axial position for levitation by using a position sensor 133 to sense the flywheel position and apply responsive control using feed back to an electromagnetic coil 131 in the actuator 130. The coil generates an upward force through ferromagnetic poles 132 in the stator housing 150 that drives flux through the top face of the flywheel 121. Because of the single active bearing which has single direction control in this configuration, the active magnetic bearing 130 preferably always carries some portion of the flywheel weight. The axial gap in the radial magnetic bearings 124, 125 can be made smaller at the top bearing such that it creates an combined upper lifting force on the flywheel. A bias current can be used with the coil 131 to linearize the control. And control can be done using an analog circuit, digital signal processor or with other methods known in the art. In the event of loss or overloading of the magnetic bearing system or when it is not operating, the flywheel is supported against excessive radial and axial displacements that would otherwise cause damage to the system, by use of upper and lower auxiliary bushings 135, 137. The bushings 135, 137 act against the upper and lower shafts 134, 136 and the axial faces of the flywheel 121. The long upper shaft is installed by a shrink fitting operation over a shorter stub shaft that is machined on the flywheel 121 to reduce machining costs. The bushings are preferably constructed of a softer material than the flywheel such as bronze. Energy storage and extraction is made possible through the use of an attached brushless motorlgenerator 138. This configuration of the invention illustrates use of a radial gap permanent magnet motor/generator. The motor/generator 138 is constructed from a rotor that is comprised of one or multiple pieces of radially magnetized magnet that are contained inside a high strength sleeve. The permanent magnet is preferably a high energy product type for maximum power capability with increased radial airgap capability. The reinforcing sleeve is preferably a low or non-ferromagnetic material such as stainless steel. The rotor 139 is surrounded by a laminated stator 140 that contains the coils, not shown, for power conversion. A three phase arrangement is a standard configuration. The power and magnetic bearing wires 141 are connected to outside the vacuum 122 through the use of hermetically sealed feedthroughs 142. The vacuum 122 inside the flywheel container 123 is sealed using a pinch-off tube 143. The vacuum 122 is maintained for the life of the system 120 against outgassing of internal components by using a getter pump 144. In this system configuration, some control electronics 145 are included with the flywheel container 123. An upper non-evacuated chamber 146 houses the electronics 145 and provides space for electrical connections 147. The flywheel system 120 is preferably installed below ground and external cabling 149 provides connectivity to the unit by using a sealed water tight connection 148.

Figure 26:
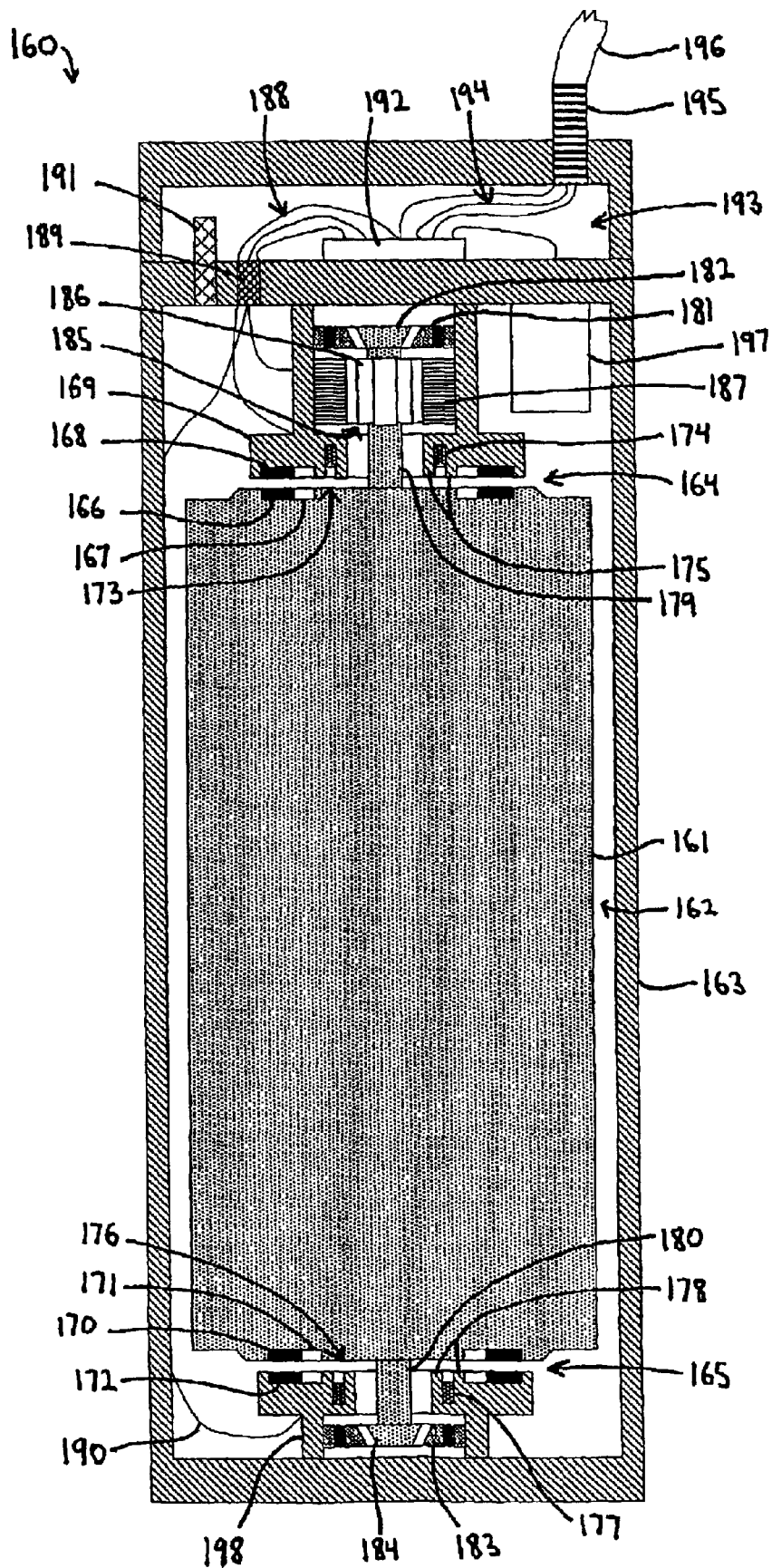
FIG. 26 is a schematic elevation of an alternate configuration of a flywheel energy storage system in accordance with the invention.

An alternative configuration of the invention showing alternate variations of the components is shown in FIG. 26. The system 160 is comprised of a solid steel flywheel cylinder 161 housed in a container 163 that is maintained at low pressure 162. The flywheel is supported for rotation using upper and lower passive radial magnetic bearings 164, 165. The bearings use axially magnetized permanent magnet pieces 166, 170 that are magnetically attracted to the flywheel 161 and are contained inside cups 167, 171 in the axial faces of the flywheel 161. The magnets are made of pieces around the circumference, thereby limiting hoop magnet stresses for high speed rotation and allowing very easy assembly. The magnet pieces can include two or more rings of alternating polarities for increased radial stiffness or radially multipoled arc segments could be used. The rotating permanent magnets 166, 170 cooperate with stationary permanent magnets 168, 172 attached to upper and lower stator housings 169, 198. This configuration of the invention illustrates axial control using upper and lower active magnetic bearings 173, 176. The active bearings are comprised of electromagnetic coils 174, 177 that generate upward and downward forces on the flywheel 161 through use of pole rings 175, 178 that surround the coils and direct flux into the axial faces of the flywheel 161. Because of having both upward and downward force control, the flywheel can be operated at the position of metastable equilibrium if desired. The axial control thereby positions the flywheel such that the upward force from the upper passive magnetic bearing is equal to the downward force exerted by the bottom magnetic bearing and the weight of the flywheel. The result is that extremely low power consumption is sufficient to maintain levitation of a flywheel weighing several hundred pounds. The drawback is that control wires 190 must be run to the bottom of the chamber 163. When the magnetic bearing system is not operating or is overloaded, the flywheel spins on auxiliary upper and lower auxiliary bearings 181, 183. The system configuration illustrates an auxiliary bearings system that uses mechanical rolling element bearings, such as hybrid ceramic tandem pair ball bearings. The flywheel has tapered engagement surfaces 182, 184 that radially center the flywheel at each end when spinning on the auxiliary bearings 181, 183. The centering action has the added benefit of preventing system rattling and damage during shipping and installation. The centering engagement surfaces 182, 184 are attached to the ends of the uppers and lower attached shafts 179, 180. The upper shaft 179 also includes the motor/generator 185 for storing and retrieving energy. The motor/generator could alternatively be located at the bottom end and separate a separate motor and generator could also be used. This configuration of the system illustrates use of a reluctance motor/generator. The efficiency of this motor/generator is typically lower than that of a permanent magnet design but it is low cost and with a separately excited field coil, power regulation electronics can be simplified. The motor/generator 169 uses a steel gear tooth rotor that is attached to the upper shaft 179. The rotor is surrounded by a laminated stator 187 with three phase coils, not shown, for power conversion. The motor/generators used with the invention can use position sensors to control commutation or they can be sensorless in that they use the actual coils for sensing the rotor position. Likewise, the magnetic bearings can use position or velocity sensors of instead the levitation coil can also be used to provide feedback. The wires 188 for the system operation exit the vacuum 162 through use of vacuum feedthroughs 189. In this configuration, the top non-evacuated chamber 193 is used for connections of the internal and external wires 188, 194 on a barrier strip 192. Cabling 196 for providing connections to the above ground electronics is attached to the system 160 using a watertight connector 195. The vacuum 162 of the flywheel chamber 163 is sealed using a pinch off tube however a valve could also be used. A getter pump 197 is used to maintain the vacuum for the life of the system by sorbing the outgassing from the internal components.

Figure 27:
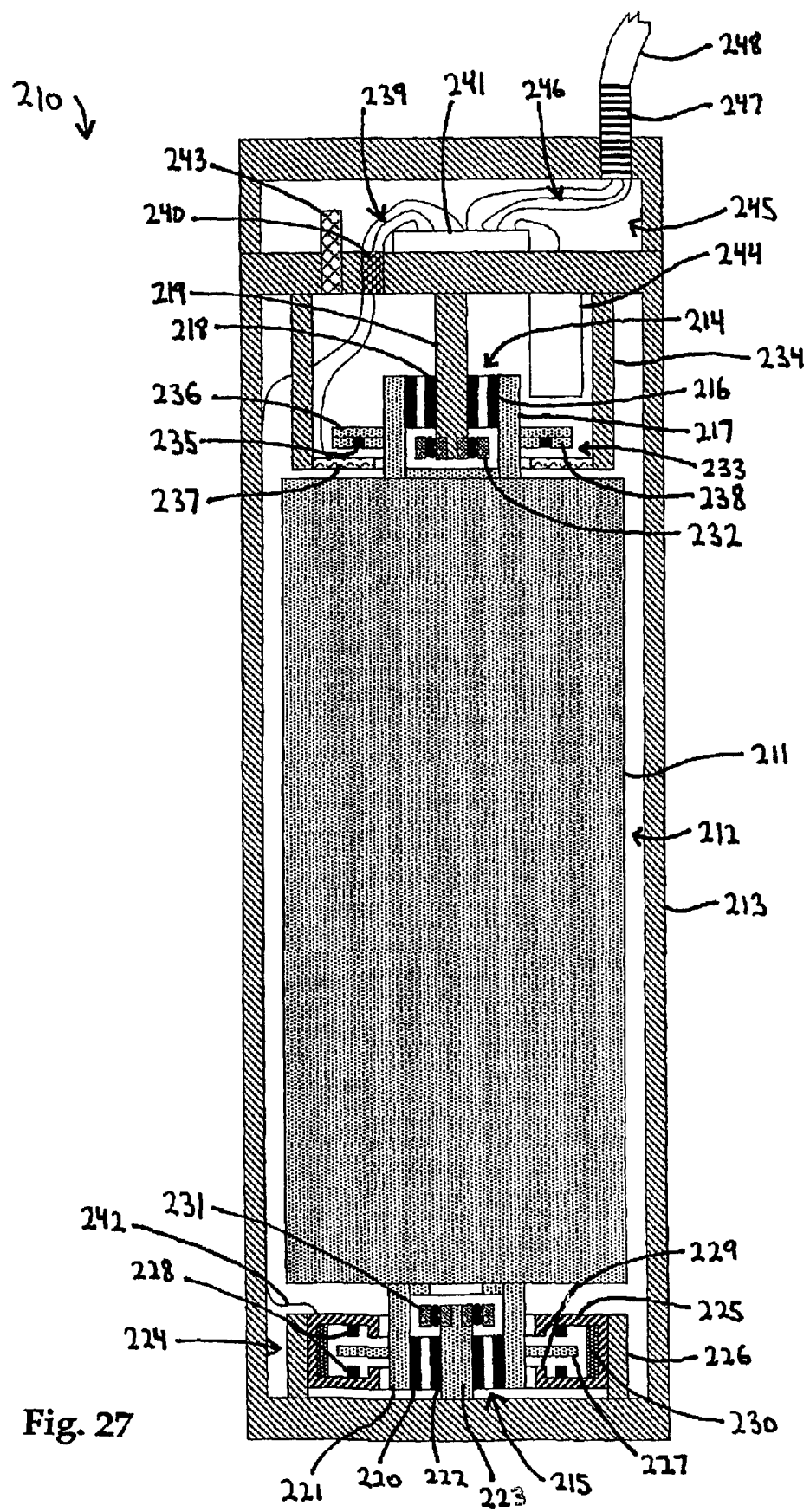
FIG. 27 is a schematic elevation of another alternate configuration of a flywheel energy storage system in accordance with the invention.
Figure 28:
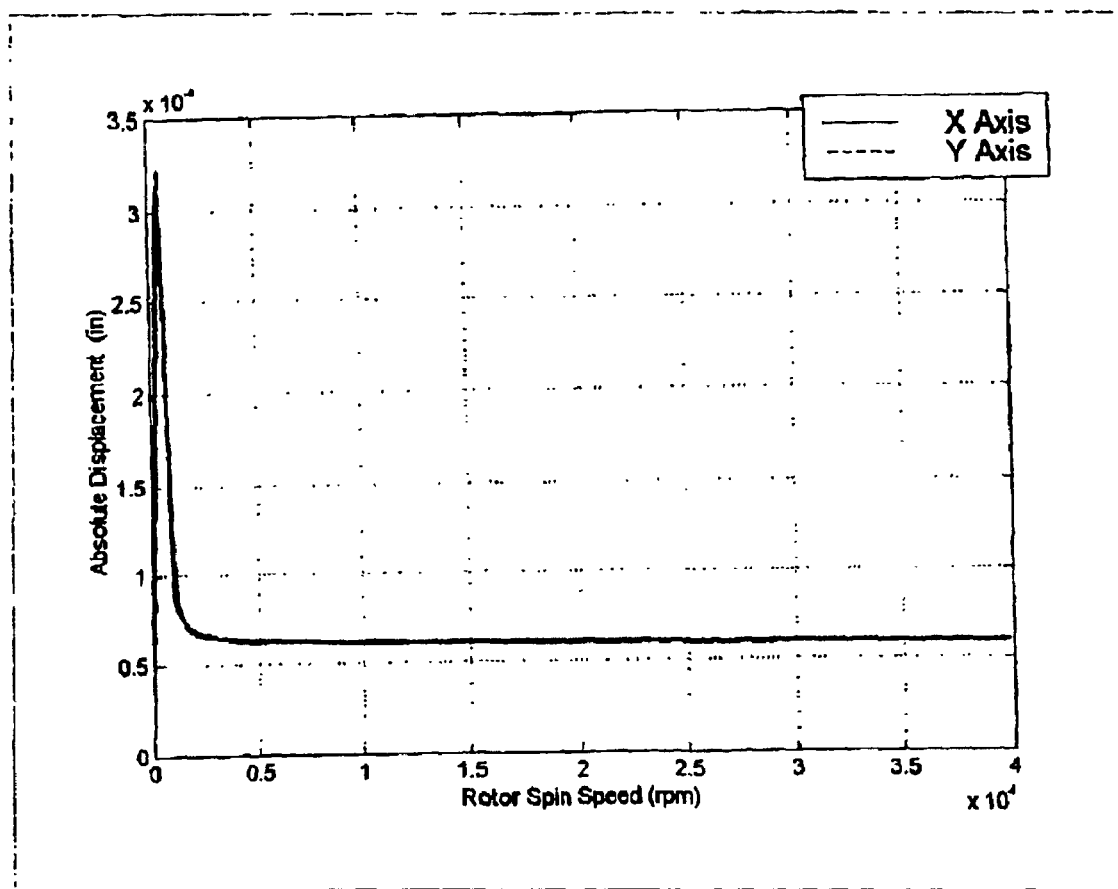
FIG. 28 is a graph of dynamic response versus operating speed for a flywheel energy storage system in accordance with the invention.

A second alternative configuration of the flywheel energy storage system in accordance with the invention is shown in FIG. 27. The system 210 is comprised of a solid steel cylinder flywheel 211 that is housed inside a container 213 maintained at low pressure 212. The flywheel 211 is supported for rotation using upper and lower passive radial magnetic bearings 214, 215. The configuration illustrates use of radial magnetic bearings that work in radial repulsion. The passive bearings 214, 215 use a permanent magnet rings 216, 220 that are installed inside tube shafts 217, 221, which are attached to the flywheel ends either through a shrink fit or bolting. The rotating magnets 216, 220 radially repel another set of permanent magnet rings 218, 222 attached to stationary shafts 219, 223 that are attached to the flywheel housing 213. The interaction between the radial bearings 214, 215 also produces an unstable axial vertical force that supports the weight of the flywheel 211. Axial stability is maintained using a permanent magnet bias axial magnetic actuator 224. As with all the different components and combinations shown in the other configurations, the use of a permanent magnet biased actuator bearing could also be used with other configurations. The active actuator uses a ferromagnetic yoke 225 that acts upon a thrust disk 227 attached to the bottom shaft tube 221. The actuator 224 achieves very high force capability in both directions and is linear due to the use of a non-coincident bias flux path. It is useful for lifting and positioning large mass flywheels of the invention. The permanent ring magnets 228 provide bias flux while a control coil 230 drives a control flux through poles 229 of the yoke 225. A current in one direction causes upward force while current in the other direction causes the opposite direction force. Control wires 242 are run to the actuator 224. When the magnetic bearing system is not operating or is overloaded, the flywheel spins on auxiliary mechanical bearings 232, 231 which in this case are located inside the rotating portion. In this configuration shown, the motor/generator illustrates an axial gap design and also a design that has an air core. The motor/generator 233 uses axially magnetized magnets 235 that are attached to a rotating disk 238 on the upper shaft tube 217. Another back-iron disk 236 is installed to provide a flux path for the top ends of the magnets 235. The flux form the motor/generator magnets travels axially through the airgap to the top axial face of the flywheel 211, and then back to an adjacent magnet. An air core wound stator, preferably of three phase construction, is placed in the axial airgap for power conversion. The stator coils are supported using an upper stator housing 234. The use of an air core design can increase efficiency due to elimination of eddy current and hysteresis losses as well as reduce destabilizing forces and moments that are generated. However, the large air gap potentially requires more motor/generator magnet material. An axial gap motor/generator can be used to eliminate radial destabilizing forces that passive radial magnet bearings would have to overcome. The wires for control and power conversion 239 exit the vacuum 212 using vacuum feedthroughs 240 and make connection with the external wiring 246 using a barrier strip 241. The external cabling 248 connects to the system using a watertight connection 247. The vacuum 212 is sealed using a pinch off tube 243. The vacuum is maintained for the life of the system using a getter pump, however other pumping methods could be used as well.

One of the benefits of using passive radial magnetic bearings with the invention, besides the increased reliability and reduced electronics over 5 active axes magnetic bearing systems, is the extremely smooth operation. By using a rigid solid cylinder rotor with any flexural resonances in the operating speed, the flywheel spins without vibrations once past the rigid body critical speeds. The dynamic response versus operating speed is shown for a flywheel operating up to 40000 rpm. The large flywheel mass and low relative radial stiffness of the passive bearings cause the rigid body critical to be traversed at very low speed, less than 1000 rpm, when there is not much energy stored. Above that speed the flywheel simply and automatically spins about its mass center to high speeds. For dynamic stability, the ratio of polar to transverse intertia of the flywheel is greater than 1 and preferably greater than 1.2 for some margin. Neglecting the flywheel shafts, an inertia ratio of 1 results in a cylinder length greater than the cylinder radius multiplied by $(3)^{1/2}$.

Figure 29:
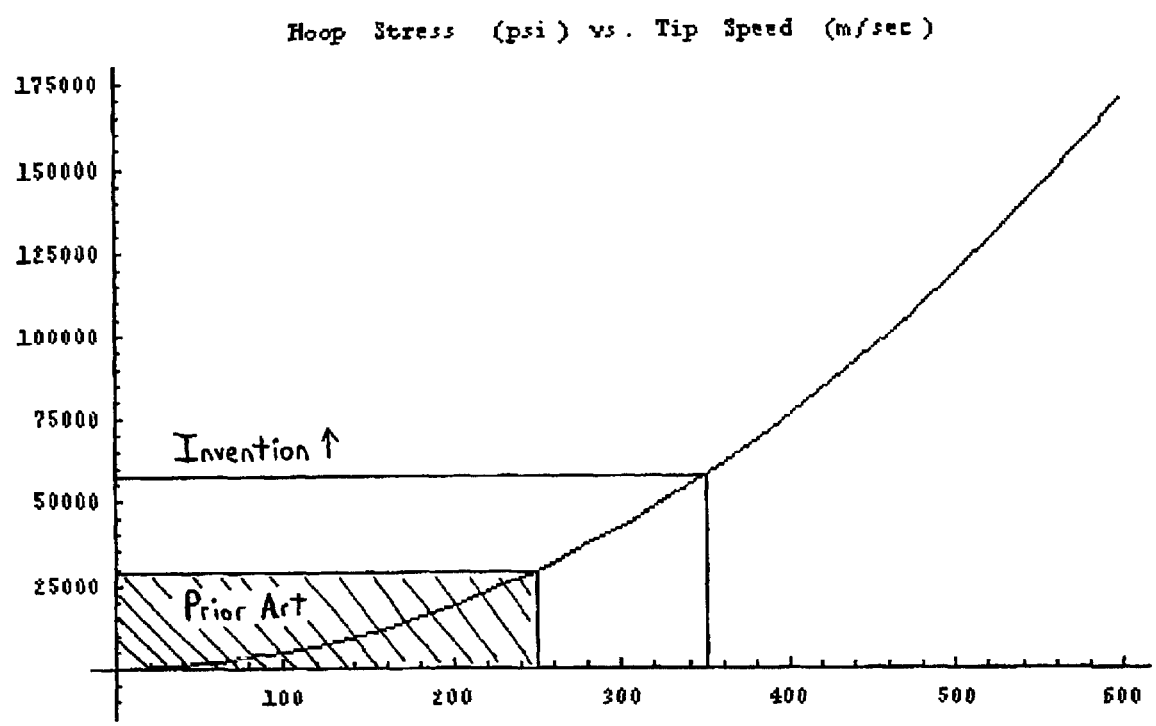
FIG. 29 is a graph of hoop stress versus flywheel tip speed showing a comparison of the invention and prior art.
Figure 30:
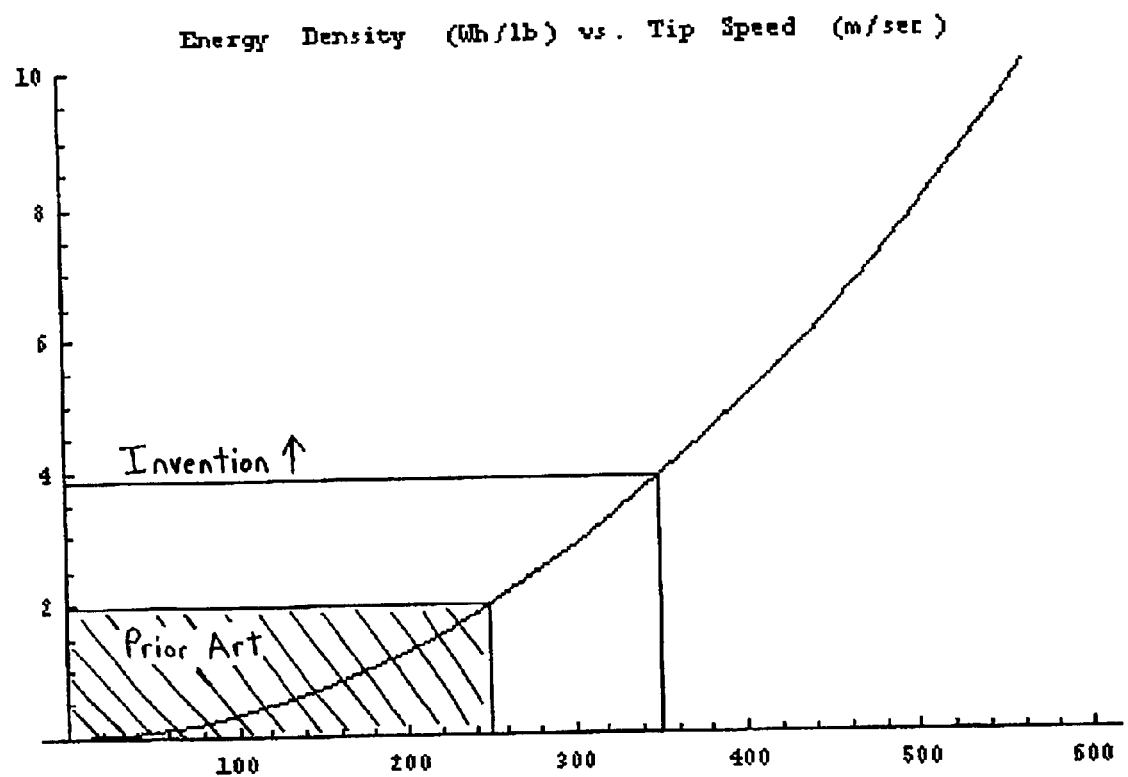
FIG. 30 is a graph of energy density versus flywheel tip speed showing a comparison of the invention and prior art.

The invention provides a method for a steel energy storage flywheel to operate at much increased stress levels due to a cylindrical design using the manufacturing attributes of the alloy steel, use of a fracture mechanics rated operating speed, nondestructive evaluation and also a simple, long life magnetic bearing system. The achievable operating stress levels for a steel flywheel are more than double those of previous commercial flywheels. A comparison of operating stress of the invention and prior art is shown in FIG. 29. The invention can operate with a tip speed above 350 m/sec (57 ksi) and conceivably as high as 600 m/sec (168 ksi) using special alloys, flaw size limits and a limited cycle life. The level of maximum operating stress in the flywheel can be as high as 60–95% of the yield strength of the material at the point of maximum stress. The higher achievable operating speed allows storage of more energy with the same amount of flywheel weight and thus the flywheel size and cost can be significantly reduced. A comparison of energy density of the invention and prior art is shown in FIG. 30. At only 350 m/sec, the invention stores nearly twice the energy per weight of the flywheel. At 500 m/sec for which the fracture analysis results were given, the invention stores roughly 4 times more energy per pound. The result is not only a reduction in the cost of the flywheel, but also in the amount of bearing magnets and the size of the flywheel system container. The steel flywheel also becomes useful for applications of telecommunication back up lasting more than one hour. At 350 meters per second, the flywheel also stores more than 66 kWh per outside cubic meter of flywheel which is more than many high-speed composite flywheels.

Figure 31:
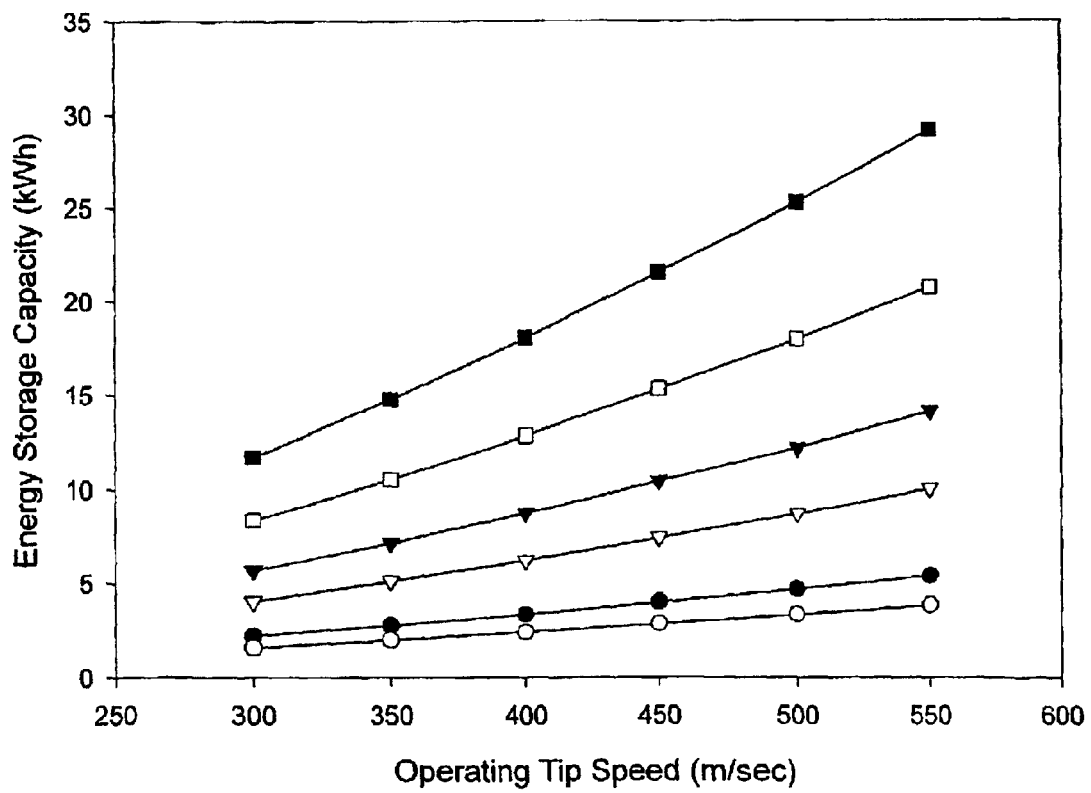
FIG. 31 is a graph of maximum energy storage capacity of flywheel cylinders versus operating tip speeds.

As mentioned previously, the flywheel cylinder is preferably designed such that it operates below any flexural critical resonance speeds for smoothest operation. The shafts on the ends of the flywheel are preferably subcritical by limiting their length to diameter. If the diameter of the cylinder is chosen by the hardenability of the steel used and the operating speed is bounded by the cycle life required through fracture mechanics, the length of the flywheel of the flywheel is the remaining factor. If the cylinder length is made too long, it will encounter the first flexural resonance in the operating speed range. The maximum cylinder length is therefore bounded by the cylinder diameter and operating speed and controls the maximum energy storage capability. The length of the cylinder resulting a cylinder flexural resonance at the operating speed is roughly $L=169*(D/w)^{1/2}$ assuming free-free end conditions as with low stiffness passive radial magnetic bearings. The diameter, D is in meters, length, L is in meters and the speed, w is in radians per second. In terms of the tip speed, v in meters per second, L=119*D*(1/v)^1/2 For an operational speed at 50% of the first flexural resonance, L=119*(D/w)^1/2. The maximum energy storage capability is shown for different diameter cylinders versus allowable cylinder operating speeds in FIG. 31. For each diameter shown, 2 plots are shown with one bounding the upper energy storage using a length such that the resonance occurs at the operating speed and the other with the energy bounded such that the operating speed is 50% of the resonance speed. Somewhere in between the two criterions is a satisfactory maximum energy storage capability that avoids significant vibrations. From the figure, it is clear that steel flywheels of the invention are capable of storing large amounts of energy as much as 20 to 30 kilowatt-hours. Previous steel flywheels have stored only around 2 kilowatt hours and less.

Figure 32:
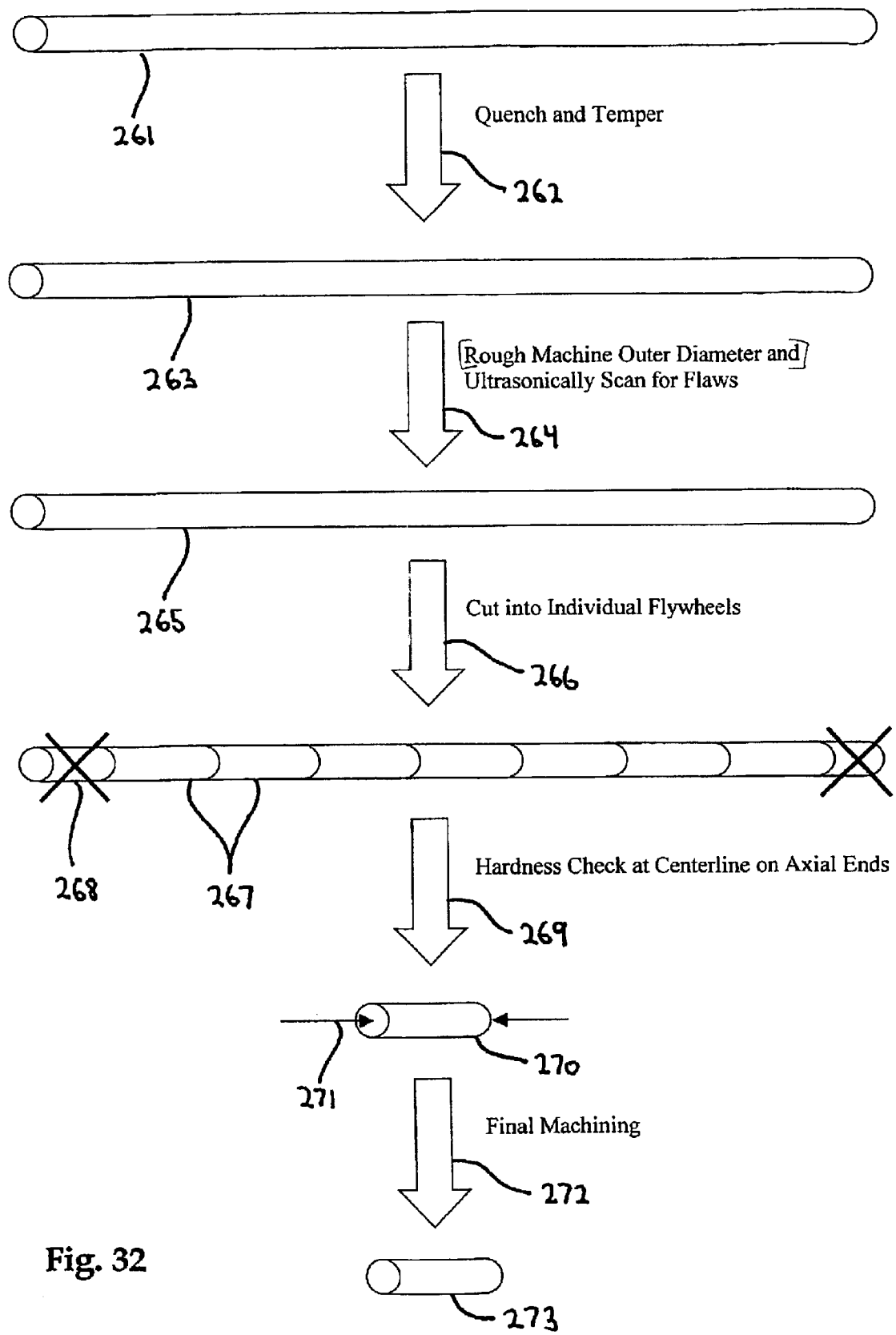
FIG. 32 is a process flow diagram of a preferred process for manufacture of cylinder flywheels of the invention.

To manufacture the flywheels in accordance with the invention a preferred process insuring quality assurance is shown in FIG. 32. The flywheel cylinders are manufactured in the form of a long log round, potentially longer than 20 feet in length. The process insures flywheel integrity by hardening the flywheels in the form of a multiple flywheel log, before cutting and final machining. This requires much more difficult cutting and machining because of the already high hardness condition, however it allows a method to insure the center strength and the very simple flywheel design does not require much machining. The steel round 261 can be forged from vacuum arc remelted or electroslag remelted steel if required for uniformity and the increased transverse toughness for increased operating stresses. The process 260 consists of taking the alloy steel round 261 and skinning or rough machining to remove decarburization at the surface, and then heat treating it using process for quenching and tempering 262 that is known in the art for the type of steel used. For air hardening steels, the quenching could be to simply cool the round in air. The log 263 is ultrasonically scanned 264 in a water tank to insure a limited flaw size and rough machining can also be done prior if needed in order the testing surface requirements. Other NDE methods can also be employed such as eddy current, X ray, etc., if desired. The NDE could also be applied later after the flywheels are cut and or machined, however this is more costly due to much increased set time. The log 265 is then cut 266 into individual flywheels 267. The end portions are preferably avoided and recycled as they contain a different hardness due to heat loss out the ends. The cylinders 270, can then be hardness checked 269 at the flywheel end face and preferably at the centerline 271. The hardness check verifies the final strength is acceptable and a check on both ends insures that it is uniform. Tensile test samples and fracture toughness samples could also be cut from the log between flywheels for batch testing if desired. If the flywheels were cut and rough machined before the heat treatment, no method would be available to insure the centerline strength of the flywheel in the center of its length. The flywheels 270 are then final machined 272 to produce a final flywheel cylinder 273.

Obviously, numerous other modifications, combinations and variations of the preferred embodiments described above are possible and will become apparent to those skilled in the art in light of this specification. For example, many functions and advantages are described for the preferred embodiments, but in some uses of the invention, not all of these functions and advantages would be needed. Therefore, I contemplate the use of the invention using fewer than the complete set of noted functions and advantages. Moreover, several species and embodiments of the invention are disclosed herein, but not all are specifically claimed, although all are covered by generic claims. Nevertheless, it is my intention that each and every one of these species and embodiments, and the equivalents thereof, be encompassed and protected within the scope of the following claims, and no dedication to the public is intended by virtue of the lack of claims specific to any individual species. Accordingly, it is expressly intended that all these embodiments, species, modifications and variations, and the equivalents thereof, are to be considered within the spirit and scope of the invention as defined in the following claims, wherein I claim:

What is claimed is:

1. A flywheel uninterruptible power supply, comprising:
   a low pressure housing;
   a solid steel cylindrical flywheel having a length L and a diameter D, wherein L/D>1.0;
   a motor/generator attached to said flywheel for accelerating and decelerating said flywheel for storage and retrieval of energy;
   a magnetic bearing system for fully levitating said flywheel for rotation about a substantially vertical axis;
   wherein said flywheel, when fully charged in normal operation, spins with a tip speed greater than 250 in/sec.

2. A flywheel uninterruptible power supply as described in claim 1 wherein the flywheel spins with a tip speed greater than 350 m/sec when fully charged in normal operation.

3. A flywheel uninterruptible power supply as described in claim 2 wherein the full levitation magnetic bearing system uses passive radial magnetic bearings with an active axial magnetic bearing.

4. A flywheel uninterruptible power supply as described in claim 2 wherein the energy stored in the flywheel during normal operation is greater than 2 kilowatt-hours.

5. A flywheel uninterruptible power supply comprised of a flywheel that spins inside a low pressure housing and is supported for rotation about a substantially vertical axis on full levitation magnetic bearing system, said flywheel has an attached motor/generator for accelerating an decelerating said flywheel for storage and retrieval of energy, said flywheel is a solid steel cylinder with length greater than diameter and hardness of the steel in the flywheel at the centerline throughout the axial length of the large diameter portion is hardened to a hardness greater than 229 Brinnell.

6. A flywheel uninterruptible power supply comprised of a solid steel flywheel without a central hole, that spins inside a low pressure housing and is supported for rotation about a substantially vertical axis on a passive radial with active axial magnetic bearing system, said flywheel has an attached motor/generator for accelerating an decelerating said flywheel for storage and retrieval of energy, said passive radial magnetic bearings located on the upper and lower ends of the flywheel generate passive axial forces that are in opposite directions.

7. A flywheel uninterruptible power supply as described in claim 6 wherein the rotating portions of the passive radial magnetic bearings are comprised of an integral construction with the axial faces of each end of the flywheel cylinder.

8. A flywheel uninterruptible power supply comprised of a solid steel flywheel without a central hole, that spins inside a low pressure housing and is supported for rotation about a substantially vertical axis on passive radial with active axial magnetic bearing system, said flywheel has an attached motor/generator for accelerating an decelerating said flywheel for storage and retrieval of energy, said passive radial magnetic bearings are comprised of rotating bearing portions located on the axial faces of the flywheel that cooperate with upper and lower stationary bearing portions.

9. A process for manufacture of a steel cylinder flywheel for a flywheel uninterruptible power supply, comprising:
   forging a billet of steel into an elongated steel log;
   turning said log to produce a true cylindrical shape about a center axis in the form of a multiple flywheel log;
   hardening said multiple flywheel log; and
   after hardening, cutting and machining said hardened multiple flywheel log into individual flywheels.

10. A process as described in claim 9 wherein the hardness of at least one axial end of the flywheel is measured after cutting the flywheel from the multiple flywheel log.

11. A process for manufacture of a solid steel cylinder flywheel for a flywheel uninterruptible power supply, comprising:
   selecting a solid steel cylinder of a desired length and diameter, and having features machined therein for supporting said cylinder in an evacuated chamber for high speed rotation;
   heat treating said cylinder by heating and quenching on a schedule that produces a desired degree of hardness;
   tempering said hardened cylinder to produce a desired degree of toughness; and
   ultrasonically scanning said cylinder for flaws after quenching and tempering.

12. A process as described in claim 11 wherein the flywheel is rejected if flaws are detected with length greater than ⅛th inch.

13. A process as described in claim 11 wherein the flywheel is rejected if flaws are detected with length greater than a threshold value at a diameter less than 40% of the outer diameter of the flywheel.

14. A flywheel uninterruptible power supply comprised of a flywheel that spins inside a low pressure housing and is supported for rotation about a substantially vertical axis on full levitation magnetic bearing system, said flywheel has an attached motor/generator for accelerating an decelerating said flywheel for storage and retrieval of energy, said flywheel is a solid steel cylinder with length greater than diameter and during normal operation stores more than 4 watt-hours per pound of flywheel weight.

15. A flywheel uninterruptible power supply comprised of a steel flywheel that spins inside a low pressure housing and is supported for rotation about a substantially vertical axis on passive radial with active axial bearing system, said flywheel has an attached motor/generator for accelerating and decelerating said flywheel for storage and retrieval of energy wherein the uninterruptible power supply is used to provide back up power lasting more than one hour for telecommunications applications.

16. A flywheel uninterruptible power supply comprised of a flywheel that spins inside a low pressure housing and is supported for rotation about a substantially vertical axis on full levitation magnetic bearing system, said flywheel has an attached motor/generator for accelerating an decelerating said flywheel for storage and retrieval of energy, said flywheel is a solid steel cylinder that spins at a speed in normal operation that would cause a fracture failure in less than one hundred thousand cycles between normal operating speed and ten percent of normal operating speed.

17. A flywheel as described in claim 16 wherein the life of the flywheel is determined by fracture mechanics.

18. A flywheel as described in claim 17 wherein the flywheel is a solid steel cylinder that spins at a speed in normal operation that would cause a fracture failure in less than 50 thousand cycles between normal operating speed and ten percent of normal operating speed.

19. A flywheel uninterruptible power supply, comprising:
   a flywheel that spins inside a low pressure housing and is supported for rotation about a substantially vertical axis on full levitation magnetic bearing system, said flywheel has an attached motor/generator for accelerating an decelerating said flywheel for storage and retrieval of energy, said flywheel is a solid steel cylinder with a diameter that is less than the ideal critical diameter for the steel used to make the flywheel.

20. A flywheel as described in claim 19 wherein the ideal critical diameter is calculated using the multiplying factors of ASTM A-255.

21. A flywheel uninterruptible power supply, comprising:
   a flywheel that spins inside a low pressure housing and is supported for rotation about a substantially vertical axis on full levitation magnetic bearing system, said flywheel has an attached motor/generator for accelerating an decelerating said flywheel for storage and retrieval of energy, said flywheel is a solid steel cylinder that is hardened to centerline structure throughout the axial thickness of the large diameter portion that is greater than 40% martensite.

22. A flywheel uninterruptible power supply, comprising:
   a solid steel flywheel that spins inside a low pressure housing and is supported for rotation about a substantially vertical axis on passive radial with active axial bearing system;
   a motor/generator attached to said flywheel for accelerating an decelerating said flywheel for storage and retrieval of energy;
   wherein said passive radial magnetic bearings are constructed of axially magnetized rare earth permanent magnet rings on said flywheel, said rings are assembled from multiple individual pieces around the circumference and are contained inside a reinforcing portion at each end of the flywheel that cooperates with axially magnetized magnet rings on the stationary portions to provide radial centering force and axial attraction forces.

23. A flywheel uninterruptible power supply comprised of a solid steel flywheel that spins inside a low pressure housing and is supported for rotation about a substantially vertical axis on passive radial with active axial bearing system, said flywheel has an attached motor/generator for accelerating an decelerating said flywheel for storage and retrieval of energy wherein said flywheel has a cylinder length that is greater than the diameter but the length equal to L meters, diameter equal to D meters and full rotational speed equal to w radians per second are defined by $L<113(D/w)^{1/2}$.

24. A flywheel uninterruptible power supply as described in claim 23 wherein the flywheel has no flexural resonant frequencies below said full operating speed.

25. A flywheel uninterruptible power supply comprised of a flywheel that spins inside a low pressure housing and is supported for rotation about a substantially vertical axis on full levitation magnetic bearing system, said flywheel has an attached motor/generator for accelerating an decelerating said flywheel for storage and retrieval of energy, said flywheel is constructed from steel with both an ultimate strength greater 110 ksi and a toughness greater than 50 ksi $(in)^{1/2}$.

26. A flywheel uninterruptible power supply as described in claim 25 wherein said flywheel is constructed from steel with both an ultimate strength greater 150 ksi and a toughness greater than 110 ksi (in)^1/2.

27. A flywheel uninterruptible power supply comprised of a steel flywheel that spins inside a low pressure housing and is supported for rotation about a substantially vertical axis on passive radial with active axial bearing system, said flywheel has an attached motor/generator for accelerating an decelerating said flywheel for storage and retrieval of energy wherein said flywheel steel is an alloy containing chromium, nickel and molybdenum.

28. A flywheel uninterruptible power supply as described in claim 27 wherein the flywheel steel contains more than 1.7% nickel and more than 0.8% chromium.

29. A flywheel uninterruptible power supply, comprising
a steel flywheel that spins inside a low pressure housing, and an attached motor/generator for accelerating an decelerating said flywheel for storage and retrieval of energy;
a bearing system for suspending said flywheel for high speed rotation about a substantially vertical axis in said housing, said bearing system having passive radial bearings and an active axial bearing,
wherein the radial stiffness of the passive radial magnetic bearing closest to the motor/generator is equal to or greater than twice the negative axial stiffness generated by the motor/generator when said flywheel is levitated in normal operating position.

30. A flywheel uninterruptible power supply comprised of a steel flywheel that spins inside a low pressure housing and is supported for rotation about a substantially vertical axis on passive radial with active axial bearing system, said flywheel has an attached motor/generator for accelerating an decelerating said flywheel for storage and retrieval of energy wherein the flywheel inertia section operates with a maximum stress of greater than 60% of the material tensile yield strength when spinning at normal operating speed.

31. A flywheel uninterruptible power supply comprised of a steel flywheel that spins inside a low pressure housing and is supported for rotation on full levitation magnetic bearing system, said flywheel has an attached motor/generator for accelerating an decelerating said flywheel for storage and retrieval of energy, said flywheel spins with a tip speed greater than 250 meters per second and the steel in the flywheel has been vacuum arc remelted or electroslag remelted.

32. A flywheel uninterruptible power supply comprised of a solid steel flywheel that spins inside a low pressure housing and is supported for rotation about a substantially vertical axis on passive radial with active axial bearing system, said flywheel has an attached motor/generator for accelerating an decelerating said flywheel for storage and retrieval of energy wherein said flywheel has a cylinder length that is greater than the diameter but the length equal to L meters, diameter equal to D meters and normal tip speed equal to v meters per second are defined by L<80 D (1/v)^1/2 and L>R(3)^1/2.

33. A flywheel uninterruptible power supply, comprising
a solid steel cylindrical flywheel that spins inside a low pressure housing, and an attached motor/generator for accelerating an decelerating said flywheel for storage and retrieval of energy;
said flywheel having a length L and a diameter D, wherein L>D;
a bearing system for suspending said flywheel for high speed rotation about a substantially vertical axis in said housing, said bearing system having passive radial bearings and an active axial bearing,
wherein the said magnetic bearing system carries between 70–130% of the flywheel weight.

34. A flywheel uninterruptible power supply comprised of a flywheel that spins inside a low pressure housing and is supported for rotation about a substantially vertical axis on full levitation magnetic bearing system, said flywheel has an attached motor/generator for accelerating an decelerating said flywheel for storage and retrieval of energy, said flywheel is a solid steel cylinder with length greater than diameter and during normal operation stores more than 66 kWhs per cubic meter of flywheel outside volume.

35. A flywheel uninterruptible power supply, comprising:
a flywheel that spins inside a low pressure housing and is supported for rotation about a substantially vertical axis on magnetic bearing system, said flywheel has an attached motor/generator for accelerating an decelerating said flywheel for storage and retrieval of energy;
said flywheel is made primarily of steel and spins at a speed in normal operation that is calculated to cause a net section failure by use of the NASGRO equation wherein the net section stress is greater than the yield strength for an embedded crack using the width, w, equal to the flywheel length and the thickness, t, equal to the flywheel diameter in under 100,000 cycles from full speed to 10% speed.

36. A flywheel uninterruptible power supply as described in claim 35 wherein the failure is calculated to occur in less than 50,000 cycles.

37. A flywheel uninterruptible power supply as described in claim 35 wherein the failure is calculated to occur in less than 10,000 cycles.

38. A flywheel uninterruptible power supply comprised of a flywheel that spins inside a low pressure housing and is supported for rotation about a substantially vertical axis on magnetic bearing system, said flywheel has an attached motor/generator for accelerating an decelerating said flywheel for storage and retrieval of energy, said flywheel is a comprised of steel and spins at a speed in normal operation that is calculated to cause a failure by the stress intensity criterion in less than 100,0000 cycles from normal full speed to 10% speed wherein the stress intensity exceeds the plain strain fracture toughness assuming the stress and plain strain fracture toughness values at the center of the flywheel.

39. A flywheel uninterruptible power supply as described in claim 38 wherein the failure is calculated to occur in less than 50,000 cycles.

40. A flywheel uninterruptible power supply as described in claim 38 wherein the failure is calculated to occur in less than 50,000 cycles.

* * * * *